(12) United States Patent
Miyajama et al.

(10) Patent No.: US 9,525,157 B2
(45) Date of Patent: *Dec. 20, 2016

(54) SECONDARY BATTERY ASSEMBLY INCLUDING MULTIPLE LIDS

(71) Applicant: Sony Corporation, Minato-Ku (JP)

(72) Inventors: Yoichi Miyajama, Tokyo (JP); Toshio Takeshita, Tokyo (JP); Hiroaki Sato, Tokyo (JP); Atsushi Takahashi, Aichi-Ken (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/847,826

(22) Filed: Mar. 20, 2013

(65) Prior Publication Data

US 2013/0344360 A1    Dec. 26, 2013

Related U.S. Application Data

(63) Continuation of application No. 11/512,310, filed on Aug. 30, 2006, now Pat. No. 8,415,045.

(30) Foreign Application Priority Data

Sep. 2, 2005 (JP) ................................. 2005-255691

(51) Int. Cl.
*H01M 2/10* (2006.01)
*H01M 10/48* (2006.01)
(Continued)

(52) U.S. Cl.
CPC ........... *H01M 2/0202* (2013.01); *H01M 2/021* (2013.01); *H01M 2/0267* (2013.01);
(Continued)

(58) Field of Classification Search
CPC .................................................. H01M 2/0267
See application file for complete search history.

(56) References Cited

U.S. PATENT DOCUMENTS 5,759,714 A    6/1998 Matsufuji et al.
6,451,474 B1   9/2002 Kozu et al.
(Continued)

FOREIGN PATENT DOCUMENTS

CN    1196139 A    10/1998
CN    1508891 A    6/2004
(Continued)

OTHER PUBLICATIONS

Office Action from the Chinese Patent Office in patent application 201210313465, dated Dec. 18, 2014, 8 pages.
(Continued)

*Primary Examiner* — Barbara Gilliam
*Assistant Examiner* — Stephan Essex
(74) *Attorney, Agent, or Firm* — Chip Law Group

(57) ABSTRACT

A secondary battery for electronic appliance to be installed in an electronic appliance includes a battery cell in which a positive electrode, a negative electrode and an electrolyte are accommodated in a pack. A positive electrode terminal and a negative electrode terminal are lead out from one side face of the pack. The secondary battery may further include a metallic battery can accommodating the battery cell therein and a pair of lids made of a synthetic resin, each plugging an opening of the battery can.

22 Claims, 33 Drawing Sheets

(51) Int. Cl.
*H01M 2/02* (2006.01)
*H01M 2/04* (2006.01)
*H01M 2/06* (2006.01)
*H01M 2/08* (2006.01)
*H01M 4/66* (2006.01)
*H01M 10/04* (2006.01)
*H01M 10/0525* (2010.01)

(52) U.S. Cl.
CPC ....... *H01M 2/0275* (2013.01); *H01M 2/0277* (2013.01); *H01M 2/0404* (2013.01); *H01M 2/06* (2013.01); *H01M 2/08* (2013.01); *H01M 2/1066* (2013.01); *H01M 4/661* (2013.01); *H01M 10/0436* (2013.01); *H01M 10/0525* (2013.01); *H01M 10/488* (2013.01); *H01M 2/0287* (2013.01); *Y02E 60/122* (2013.01); *Y02P 70/54* (2015.11)

(56) References Cited

U.S. PATENT DOCUMENTS

| | | |
|---|---|---|
| 2004/0029000 A1 | 2/2004 | Morita et al. |
| 2004/0142239 A1 | 7/2004 | Morita et al. |
| 2004/0180260 A1 | 9/2004 | Somatomo et al. |
| 2004/0257036 A1 | 12/2004 | Kim |
| 2005/0064286 A1 | 3/2005 | Kozu et al. |
| 2005/0112415 A1 | 5/2005 | Takeshita et al. |
| 2005/0181242 A1 | 8/2005 | Suzuki et al. |

FOREIGN PATENT DOCUMENTS

| | | |
|---|---|---|
| CN | 2631052 Y | 8/2004 |
| CN | 1630954 | 6/2005 |
| EP | 1416550 | 5/2004 |
| EP | 1473785 | 11/2004 |
| JP | 5-184076 | 7/1993 |
| JP | 10-208725 | 8/1998 |
| JP | 2002-25522 | 1/2002 |
| JP | A-2002-8606 | 1/2002 |
| JP | 2002-75310 | 3/2002 |
| JP | 2002-157983 | 5/2002 |
| JP | 2002-365348 | 12/2002 |
| JP | 2003-132859 | 5/2003 |
| JP | 2003-223880 | 8/2003 |
| WO | 2005/043650 A2 | 5/2005 |

OTHER PUBLICATIONS

Office Action from the Chinese Patent Office in patent application 201210313465, dated Apr. 22, 2014, 20 pages.
European office action issued on May 15, 2015 in patent application No. 06254354.1.

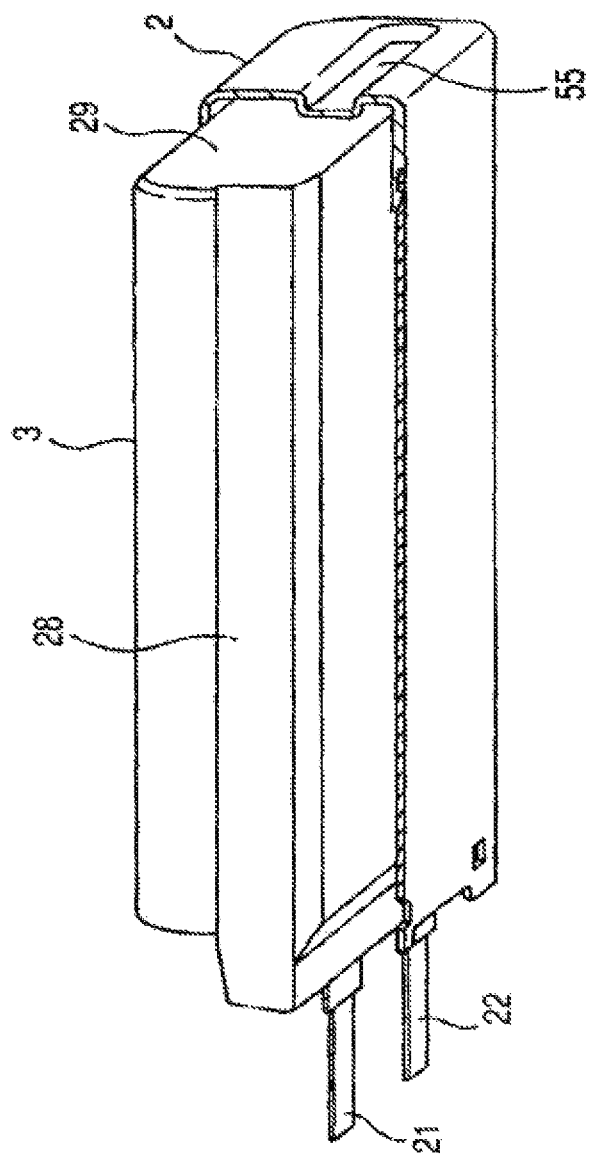

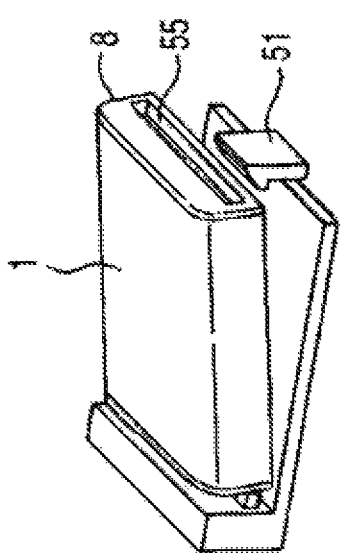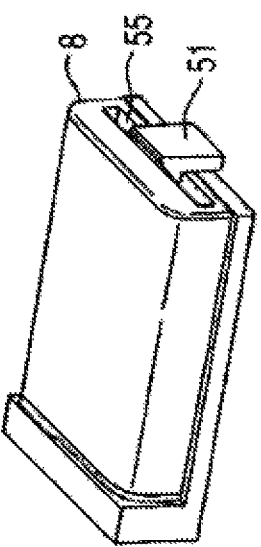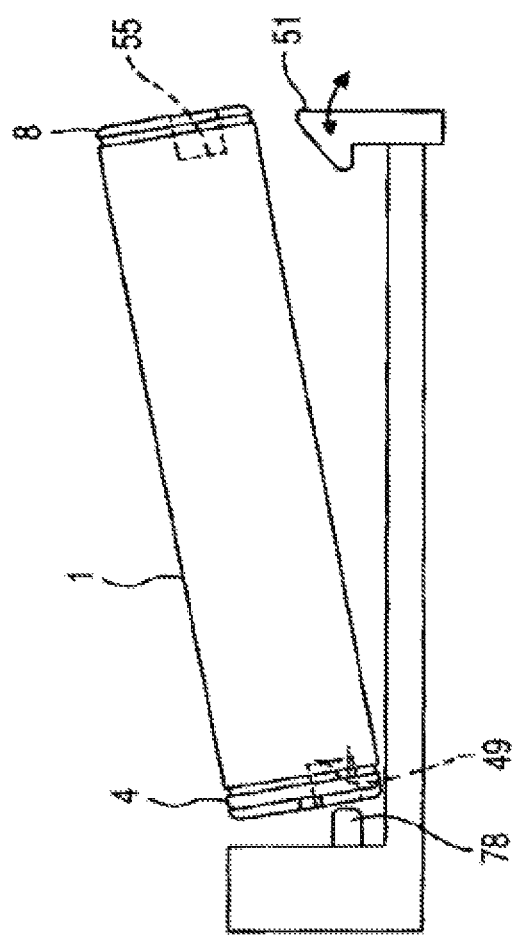
FIG. 14A
FIG. 14B
FIG. 14C

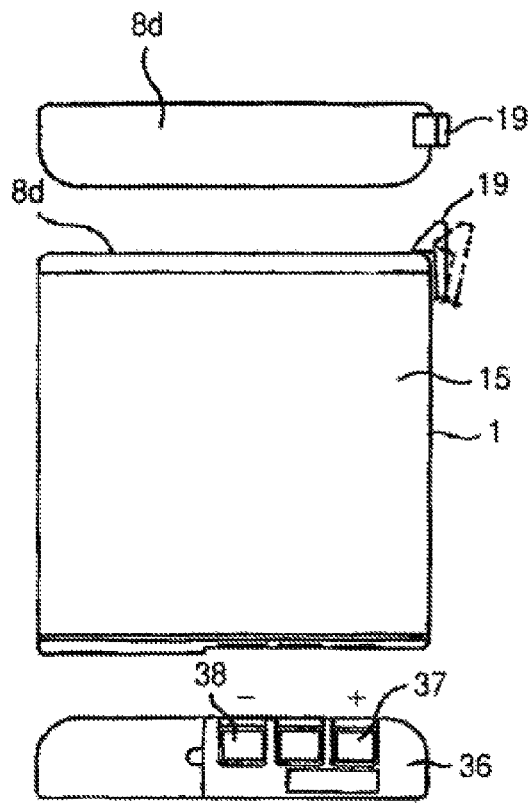
FIG. 15A
FIG. 15B
FIG. 15C
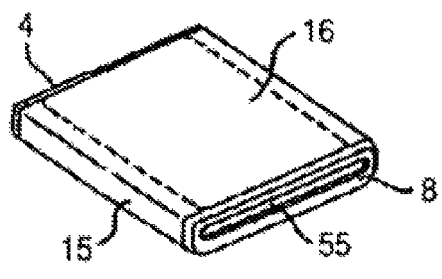
FIG. 16A
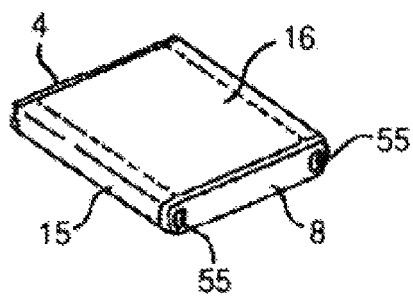
FIG. 16B

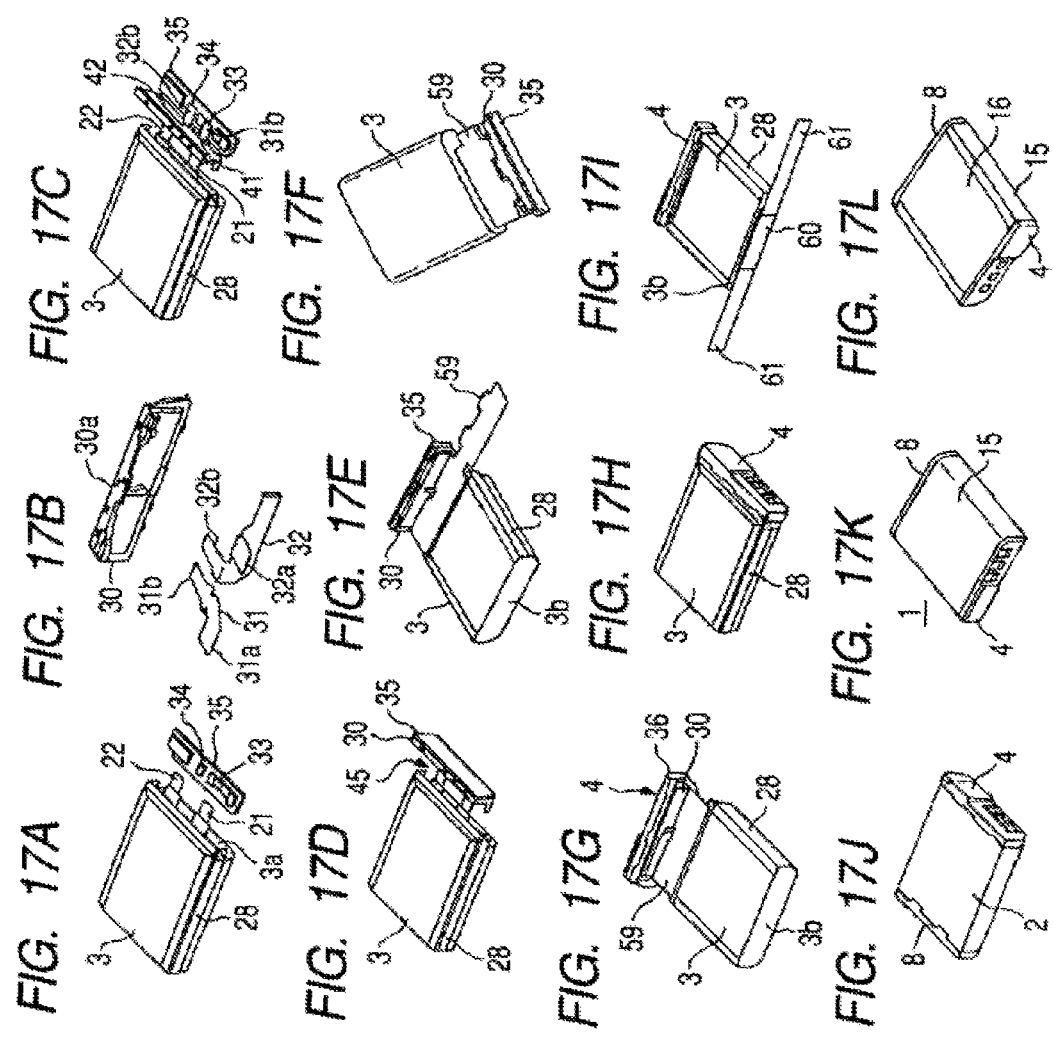

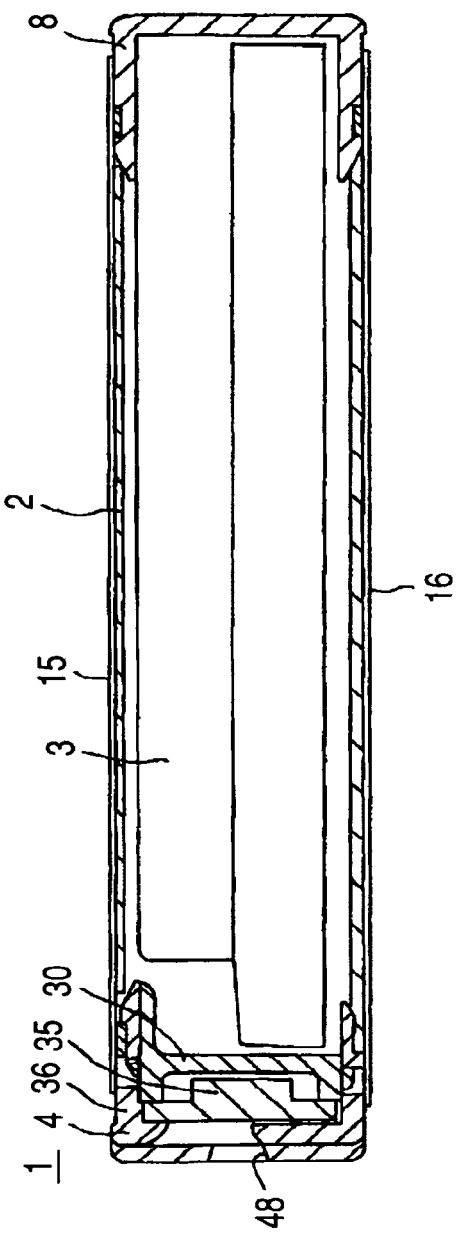

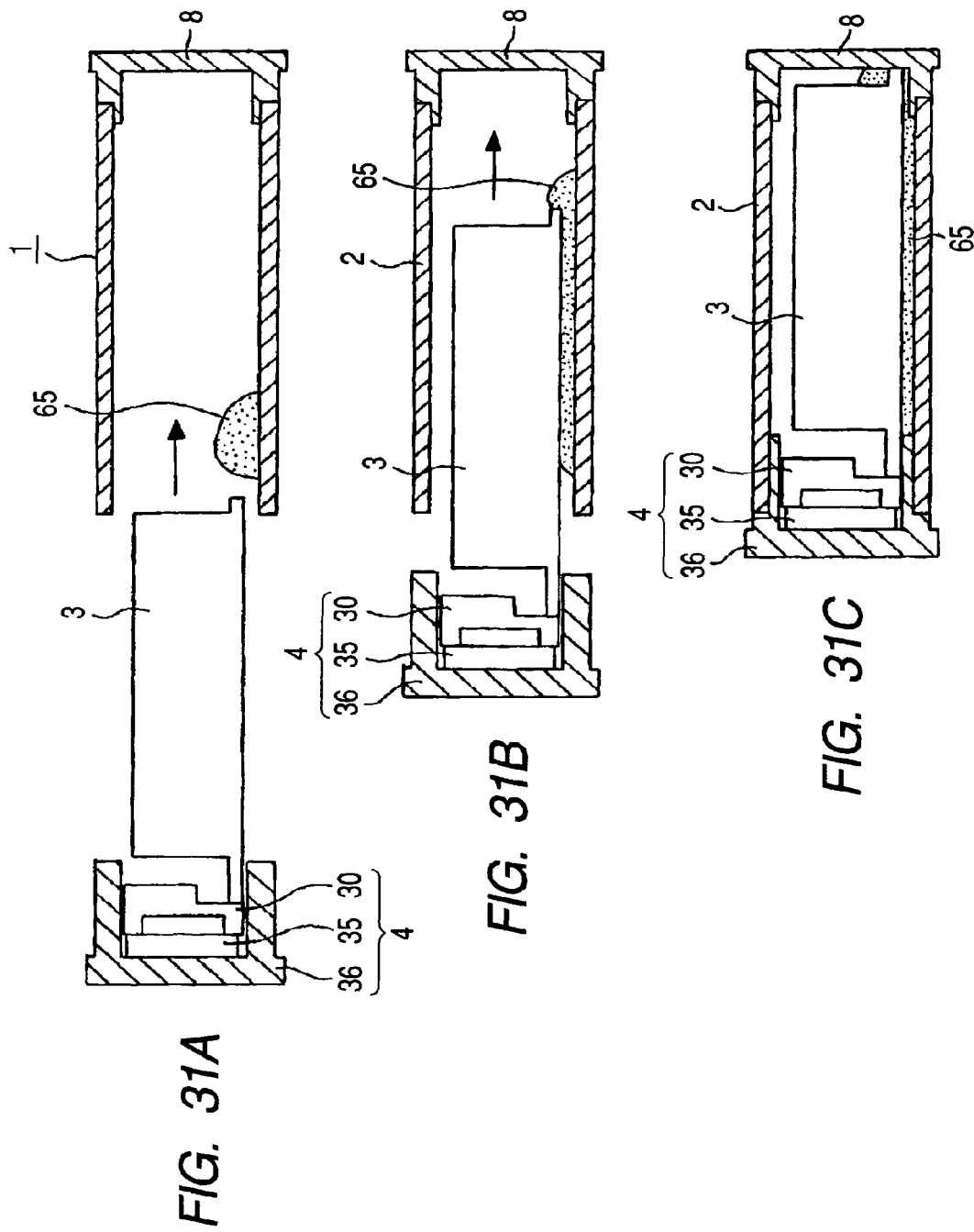

SECONDARY BATTERY ASSEMBLY INCLUDING MULTIPLE LIDS

CROSS REFERENCES TO RELATED APPLICATIONS

This is a continuation of application Ser. No. 11/512,310, filed Aug. 30, 2006, and is also based upon and claims priority under 35 U.S.C. §119 from the Japanese Patent Application JP 2005-255691 filed in the Japan Patent Office on Sep. 2, 2005, the entire contents of each being incorporated herein by reference.

BACKGROUND OF THE INVENTION

1. Field of the Invention

The invention relates to a secondary battery having an electrode body as a generating element which is accommodated in a pack, from which electric power as generated by the electrode body is taken out through a pair of positive and negative electrode terminals, such as lithium ion secondary batteries and lithium polymer secondary batteries.

2. Description of the Related Art

In recent years, the demand for portable electronic appliances including information appliances such as notebook personal computers, mobile communication instruments such as mobile telephones, and video cameras is increasing rapidly. Sealed small-sized secondary batteries such as nickel-cadmium batteries, nickel hydrogen batteries, and lithium ion batteries are frequently used as a power source of such an electronic appliance. Above all, lithium ion secondary batteries are employed in various fields while making the most of characteristics such as high voltage, high energy density and lightweight.

In particular, as a countermeasure to the liquid leakage which is problematic in the case of using a liquid based electrolytic solution, for example, there is proposed a so-called polymer lithium ion secondary battery using, as an electrolyte, a gel-like polymer film having a polymer impregnated with a non-aqueous electrolytic solution or by using an electrolyte in a fully solid state.

Such a polymer lithium ion secondary battery is being further developed for the purpose of meeting the demands for respective electronic appliances in recent years, such as downsizing, lightweight and slimming, while making the most of a characteristic that a degree of freedom of the battery shape is high in addition to the characteristics of a battery such as high energy density and lightweight.

Usually, in such a battery, for example, as illustrated in FIG. 39, a single cell 301 made of a laminate of battery elements is accommodated together with a connecting substrate 302 provided with a protective circuit and terminals in a pair of upper and lower plastic cases 303, 304, thereby forming a battery pack 300 (see, for example, Patent Document 1). Patent Document 1: JP-A-2002-8606.

SUMMARY OF THE INVENTION

According to an embodiment of the invention, there is provided a secondary battery which devises to achieve downsizing, lightweight and slimming of the battery main body, overcomes an insufficiency of the strength accompanying this and is easy for the manufacture.

In order to solve the foregoing problems, according to an embodiment of the invention, there is provided a secondary battery for electronic appliance to be installed in an electronic appliance, thereby feeding an electric power to the electronic appliance, the secondary battery being provided with a battery cell in which a positive electrode, a negative electrode and an electrolyte are accommodated in a pack, and a positive electrode terminal and a negative electrode terminal from the positive electrode and the negative electrode, respectively are lead out from one side face of the pack; a metallic battery can in which an opening is formed in the both end sides in an insertion direction of the battery cell and which accommodates the battery cell therein such that one side face from which the positive electrode terminal and the negative electrode terminal are lead out is faced towards the side of one of the openings; and a pair of lids made of a synthetic resin, each plugging the opening of the battery can, at least one of the lids plugging one of the openings towards which one side face from which the positive electrode terminal and the negative electrode terminal are lead out being provided with a positive electrode terminal part and a negative electrode terminal part to be connected to the electrodes of the electronic appliance upon being connected to the positive electrode terminal and the negative electrode terminal and being faced outwardly.

The secondary battery according to an embodiment of the invention is manufactured by assembling a pair of lids made of a synthetic resin in the metallic can in which the both ends in the insertion direction of the battery cell are opened. Accordingly, not only it is easy to manufacture the battery can, but also it is possible to form the battery can by cutting it in an arbitrary length depending upon the shape of the battery cell, whereby a degree of freedom of the design can be improved. Furthermore, by using the metallic battery can, slimming and insurance of strength can be realized at the same time so that a secondary battery which is able to meet the requirements of downsizing, slimming and lightweight of an electronic appliance can be provided.

Furthermore, since the plastic resin-made lid is used, it is possible to easily form the external shape which becomes an installing end in installing the secondary battery in a battery installing part of the electronic appliance. By this external shape, it can be used as a discrimination part for discriminating a function or attribute such as a battery capacity, the necessity of quick recharge, the presence or absence of a residual battery life display function or a control part for controlling the installation against an incompatible electronic appliance.

BRIEF DESCRIPTION OF THE ACCOMPANYING DRAWINGS

FIG. 6 is an oblique view of a battery can into which a battery cell is inserted.

FIGS. 14A-14C are views to show a state that a secondary battery to which the invention is applied is installed in a battery installing part which is provided outside an electronic appliance or the like.

FIGS. 15A-15C are views to show a secondary battery to which an external label is stuck, in which FIG. 9A is a back view, FIG. 9B is a plan view, FIG. 16A-16B are oblique views to show other example of a secondary battery which the invention is applied.

FIG. 17A-17L are a process chart to show a manufacturing process of a secondary battery to which the invention is applied.

FIG. 28 is a cross-sectional view of a secondary battery in which battery ids are assembled.

FIG. 30A-30B are side views to show an example in which an electrode part is provided in an engagement member of a battery installing part which is provided outside an electronic instrument or the like.

FIG. 31A-31C are cross-sectional views to show a state that a battery cell is adhered within a battery can using an adhesive.

DETAILED DESCRIPTION OF THE PREFERRED EMBODIMENTS

Figure 1A:
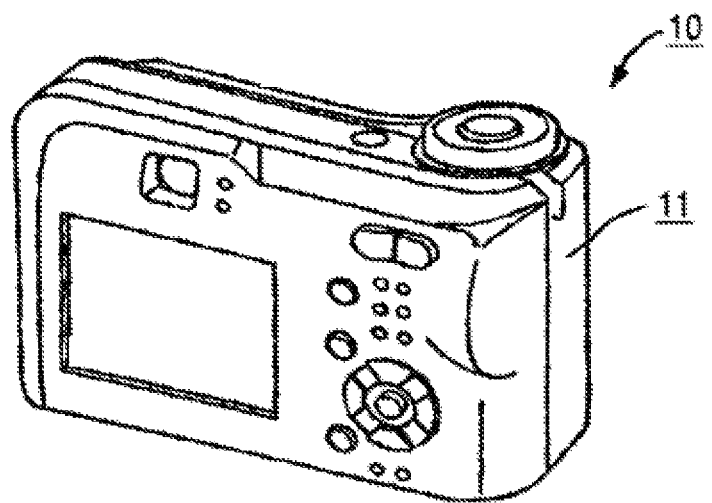
FIGS. 1A-1B are oblique views to show an example of an electronic appliance using a secondary battery to which the invention is applied.
Figure 1B:
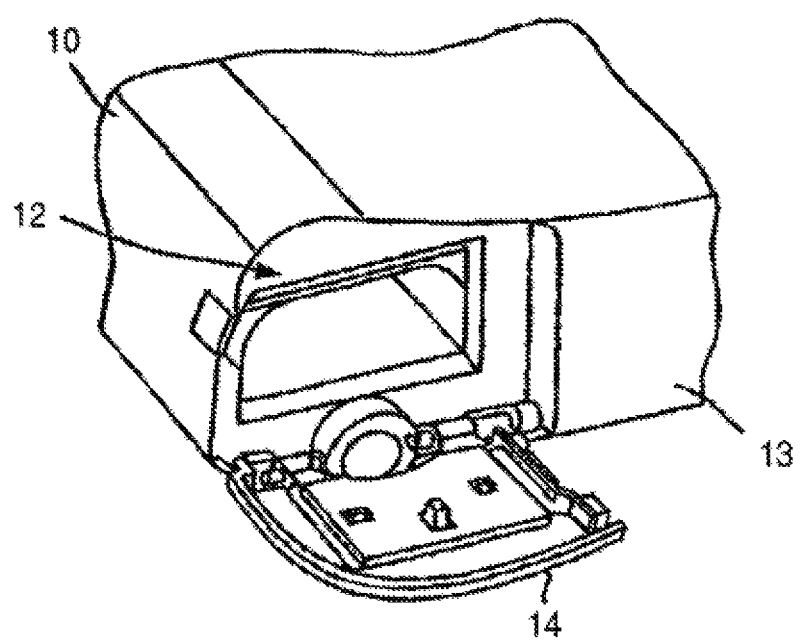

The secondary battery to which the invention is applied will be hereunder described in detail with reference to the accompanying drawings. A secondary battery 1 to which the invention is applied is, for example, a polymer lithium ion secondary battery and as illustrated in FIGS. 1A and 1B, is used for various electronic appliances, for example, electronic appliances such as a digital still camera 10. Concretely, when accommodated in a battery accommodating part 12 as provided inside a grip part 11 of a digital still camera 10 as illustrated in FIG. 1A, the secondary battery 1 supplies a drive power to this digital still camera 10. The battery accommodating part 12 is made of a substantially flat concave in response to the shape of the secondary battery 1 and when a battery lid 14 as provided rotatably in a bottom face part 13 of the digital still camera 10 is opened, is faced outwardly. Furthermore, in the battery accommodating part 12, accommodating part electrodes which are brought into contact with electrode terminal parts 37, 38 which are provided in the secondary battery 1 as described later are formed in the bottom part. Further, when the secondary battery 1 is accommodated in the battery accommodating part 12 such that an end face on which the electrode terminal parts 37, 38 are provided is an insertion end, the secondary battery 1 is connected to the accommodating part electrodes, thereby supplying a power to the digital still camera 10. Incidentally, the battery accommodating part 12 is provided with an energizing member (not illustrated) for discharging the secondary battery 1 from the battery accommodating part 12 and an engagement member 19 for engaging the secondary battery 1 within the battery accommodating part 12 in opposition to the energizing member. This engagement member 19 will be described later.

Figure 2:
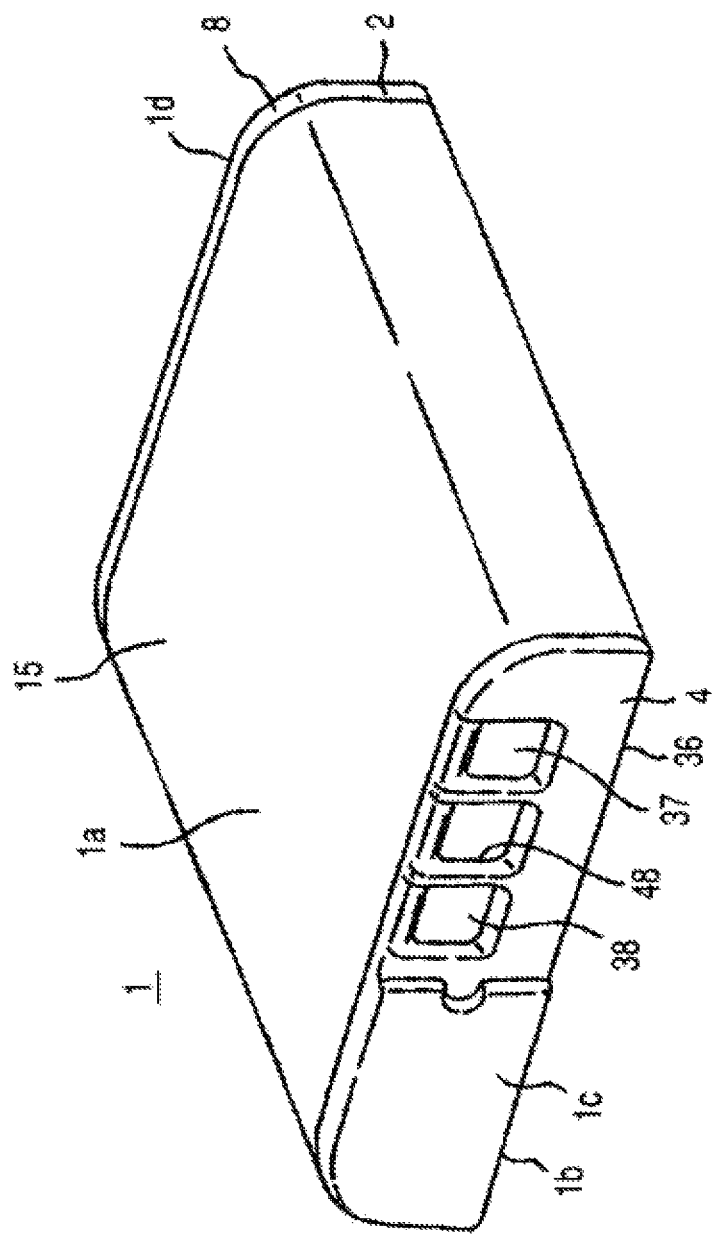
FIG. 2 is an oblique view to show a secondary battery to which the invention is applied.
Figure 3:
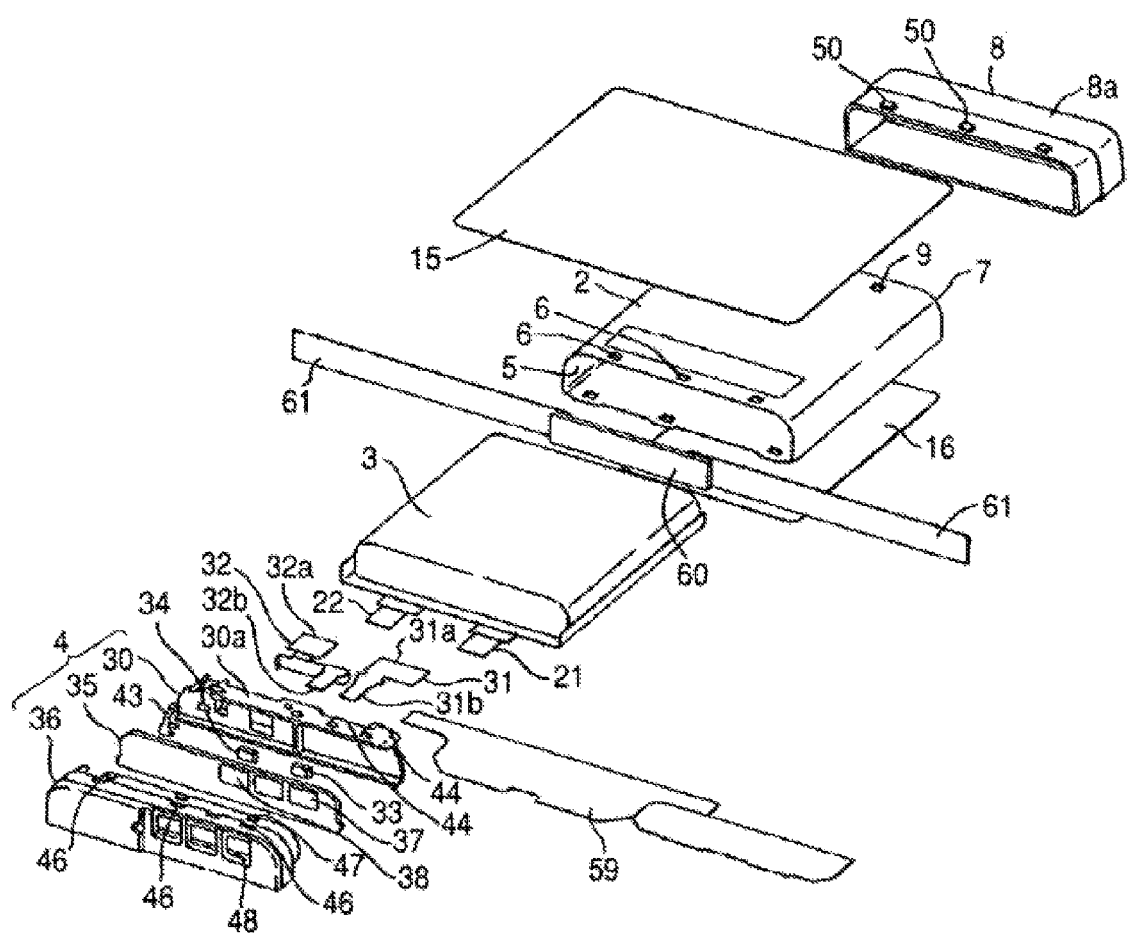
FIG. 3 is a detailed oblique view to show a secondary battery to which the invention is applied.

The secondary battery 1 will be hereunder described. As illustrated in FIG. 2 and FIG. 3, a battery cell 3 having electrode terminals packed therein is inserted from a first opening 5 of a metallic battery can 2 which is formed in a substantially flat form; the first opening 5 is plugged by a first battery lid 4 provided with terminal parts to which a positive electrode terminal and a negative electrode terminal as lead out from the battery cell 3 are connected; and a second opening 7 in the opposite side to the first opening 5 is plugged by a second battery id 8, thereby forming this secondary battery 1.

Figure 4:
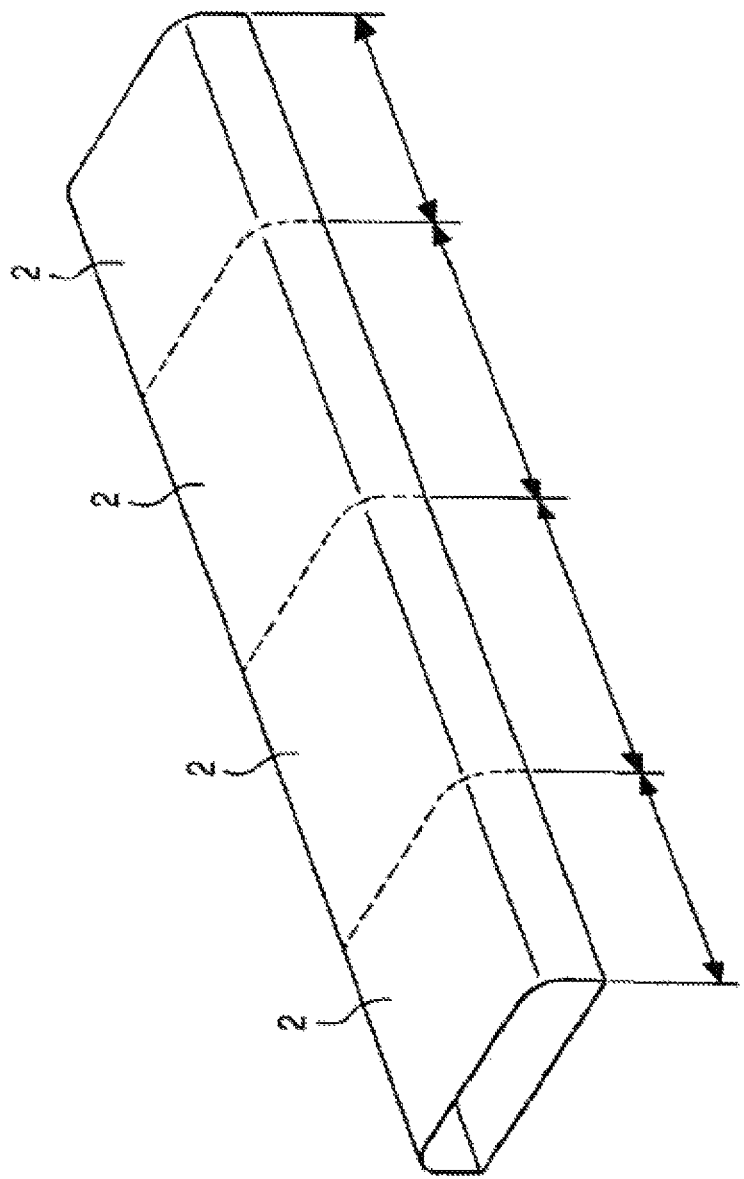
FIG. 4 is an oblique view to show a manufacturing process of a battery can.

The battery can 2 is made of a metallic casing in which the both opposing faces of a substantially flat cube are opened and is formed in a substantially trapezoidal shape with respect to the cross section thereof such that an edge in each side of the short sides is formed in a circular arc shape as illustrated in FIG. 3. As illustrated in FIG. 4, this battery can 2 is formed in a substantially flat cylinder in which the first opening 5 and the second opening 7 are formed on the both faces in the insertion direction of the battery cell 3 by extrusion molding a metallic plate such as iron into a cylinder in a substantially trapezoidal shape with respect to the cross section thereof and then cutting it into an arbitrary length depending upon the shape of the battery cell 3. By regulating a wall thickness at approximately 0.3 mm, this battery can 2 is formed in a slim shape such that when an accommodating region of the battery cell 3 is eliminated, its own thickness is controlled to the utmost; and at the same time, by using the metallic material, the battery can 2 can be provided with various impact resistances against falling, vibration, and so on, or with mechanical strengths against a sharp knife or the like, thereby preventing deformation, perforation or the like from occurring.

The first opening 5 is an insertion end from which the battery cell 3 is inserted and after insertion of the battery cell 3, is plugged by the first battery lid 4. For that reason, plural engagement holes 6 with which engagement convexes 47 as projected on the first battery lid 4 are perforated in the periphery of the first opening 5. In the engagement holes 6, when the first battery id 4 is inserted into the first opening 5, the engagement convexes 47 as projected on the first battery id 4 invade into the first opening 5 while being warped and are then engaged with the engagement holes 6. In this way, the first battery id 4 is assembled in the battery can 2.

Furthermore, the second opening 7 is formed in the opposite side to the first opening 5 and is plugged by the second battery lid 8. For that reason, plural engagement holes 9 with which engagement convexes 50 as projected on the second battery lid 8 are engaged are perforated in the periphery of the second opening 7. In the engagement holes 9, when the second battery lid 8 is inserted into the second opening 7, the engagement convexes 50 as projected on the second battery lid 8 invade into the second opening 7 while being warped and are then engaged with the engagement holes 9. In this way, the second battery lid 8 is assembled in the battery can 2.

Figure 5A:
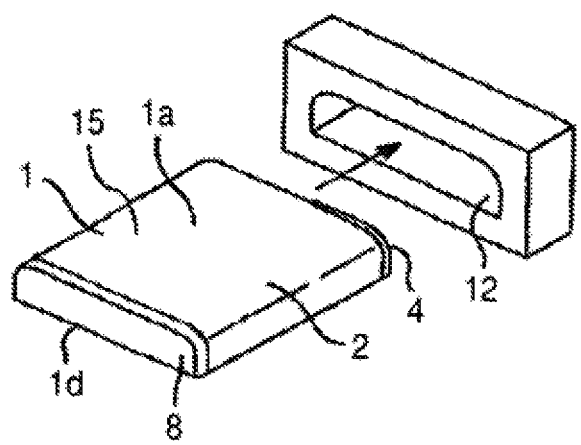
FIGS. 5A-5B are oblique views to show a state that a secondary battery to which the invention is applied is installed in a battery accommodating part of an electronic appliance.
Figure 5B:
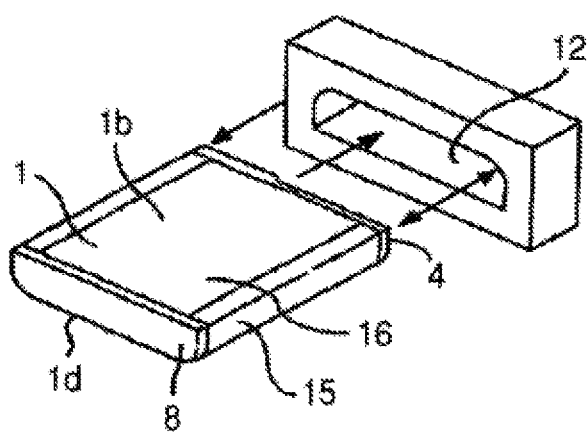

When the shape of the battery accommodating part 12 into which the secondary battery 1 is inserted together with the battery can 2 is formed in a substantially trapezoidal shape with respect to the cross section thereof such that an edge in each side of the short sides is formed in a circular arc shape as illustrated in FIG. 5A, an insertion face of the secondary battery 1 into the battery accommodating part 12 of the digital still camera 10 is defined so that erroneous insertion can be prevented. That is, as illustrated in FIG. 5A, in the case where the insertion face of the secondary battery 1 is right, the sides of the short sides of the battery accommodating part 12 are coincident with the shape of the principal face of the sides of the short sides of the secondary battery 1 so that the secondary battery 1 can be smoothly inserted. On the other hand, as illustrated in FIG. 5B, in the case where the insertion face of the secondary battery 1 is reversed, square-shaped edges in the side of the long sides of the secondary battery 1 are interfered by the edges formed in a circular arc shape in the sides of the short sides of the battery accommodating part 12 so that the insertion of the secondary battery 1 can be inhibited. In this way, in the case where the insertion face is reversed in the back and front, not only the insertion of the secondary battery 1 into the battery accommodating part 12 can be prevented, but also a user can easily confirm correctness of the insertion face of the secondary battery 1.

Furthermore, in the battery can 2, after the second opening 7 is plugged by the second battery lid 8, the battery cell 3 as connected to the first battery lid 4 is inserted, and the first opening 5 is plugged by the first battery lid 4, the insulating external label 15 is stuck. The external label 15 becomes a decorative label of the secondary battery 1 and also devises to achieve insulation of the metallic battery can 2. As illustrated in FIG. 3, the external label 15 is formed in a substantially rectangular shape and is wound over the outer periphery of the battery can 2. At this time, in the external label 15, since the battery can 2 is formed in a flat shape, a sticking work is easy, and the external label 15 is hardly separated as compared with the case of sticking it directly on the surface of the battery cell 3 as configured to pack the battery element 20.

Incidentally, an information label 16 on which a variety of information of the secondary battery 1 is described is stuck in the principal face part of the side of the long sides of the battery can 2.

Figure 7:
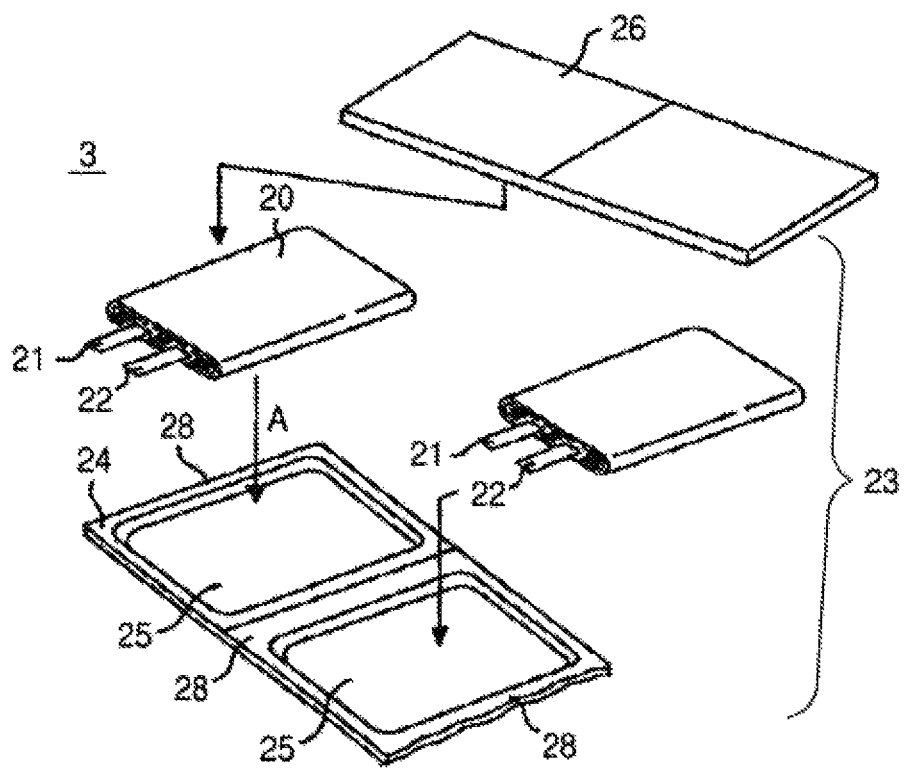
FIG. 7 is a detailed oblique view to show a battery cell.

Next, the battery cell 3 which is accommodated in the battery can 2 will be described below. As illustrated in FIGS. 3 and 7, in the battery cell 3, a strip positive electrode and a strip negative electrode are stacked via a polymer electrolyte layer and/or a separator; the battery element 20 as wound in a longitudinal direction is packed in a pack 23; and a positive electrode terminal 21 and a negative electrode terminal 22 are lead out outwardly from the positive electrode and the negative electrode, respectively.

In the positive electrode, a positive electrode active substance layer is formed on a strip positive electrode collector, and a polymer electrolyte layer is further formed on the positive electrode active substance layer. Furthermore, in the negative electrode, a negative electrode active substance layer is formed on a strip negative electrode collector, and a polymer electrolyte layer is further formed on the negative electrode active substance layer. The positive electrode terminal 21 and the negative electrode terminal 22 are welded to the positive electrode collector and the negative electrode collector, respectively. Furthermore, the positive electrode terminal 21 is made of aluminum (Al), and the negative electrode terminal 22 is formed by using nickel (Ni). These positive electrode terminal 21 and negative electrode terminal 22 are connected to a positive electrode tab 31 and a negative electrode tab 32 as held in the first battery lid 4 as described later, respectively and coupled with a positive electrode terminal board 33 and a negative electrode terminal board 34 as similarly provided in the first battery lid 4 via these positive electrode tab 31 and negative electrode tab 32, respectively.

The positive electrode can be configured by using, as a positive electrode substance, a metal oxide, a metal sulfide or a specific polymer depending upon the kind of the targeted battery. For example, in the case of configuring a lithium ion battery, it is possible to use a lithium composite oxide containing, as the major component, $Li_xMO_2$ (wherein M represents one or more kinds of a transition metal; and x varies depending upon the charge/discharge state of the battery and is usually from 0.05 to 1.10) as the positive electrode active substance. As the transition metal M which configures the lithium composite oxide, Co, Ni, Mn, and so on are preferable. Specific examples of such a lithium composite oxide include $LiCoO_2$, $LiNiO_2$, LiNi$_y$Co$_{1-y}$O$_2$ (wherein 0<y<1), and LiMn$_2$O$_4$. Such a lithium composite oxide is able to generate a high voltage and become a positive electrode active substance which is excellent in energy density. Furthermore, lithium-free metal sulfides or oxides such as TiS$_2$, MOS$_2$, NbSe$_2$, and V$_2$O$_5$ can also be used as the positive electrode active substance. A combination of plural kinds of these positive electrode active substances may be used. Furthermore, in forming a positive electrode by using such a positive electrode substance, known conductive agents or binders or the like can be added.

A material capable of doping or dedoping lithium can be used as the negative electrode material. For example, sparingly graphitized carbon based materials or carbon materials of a graphite based material can be used. More specifically, there can be used carbon materials such as heat decomposable carbons, cokes (for example, pitch coke, needle coke, and petroleum coke), graphites, vitreous carbons, organic polymer compound calcined bodies (materials resulting from carbonization by calcining a phenol resin, a furan resin, etc. at an appropriate temperature), carbon fibers, and active carbons. Besides, polymers such as polyacetylene and polypyrrole and oxides such as SnO$_2$ can be used as the material capable of doping or dedoping lithium. In forming a negative electrode from such a material, known binders or the like can be added.

The polymer electrolyte is one as prepared by mixing a polymer material, an electrolytic solution and an electrolyte salt and incorporating the gelled electrolyte into the polymer. The polymer material has properties such that it is compatible with the electrolyte solution. Examples thereof include silicon gels, acrylic gels, acrylonitrile gels, polyphosphazene-modified polymers, polyethylene oxide, and poly-propylene oxide, and composite polymers, crosslinked polymers or modified polymers thereof; and fluorine based polymers such as poly(vinylidene fluoride), poly(vinylidene fluoride-co-tetrafluoropropylene), and poly(vinyldiene fluoride-co-trifluoroethylene) and mixtures thereof.

The electrolytic solution component includes an aprotic solvent which is able to disperse the foregoing polymer material therein, for example, ethylene carbonate (EC), propylene carbonate (PC), and butylene carbonate (BC). As the electrolyte salt, one which is compatible with the solvent is used, and a combination of a cation and an anion is used. Examples of the cation which can be used include alkali metals and alkaline earth metals. Examples of the anion which can be used include Cl$^-$, Br$^-$, I$^-$, SCN$^-$, ClO$_4^-$, BF$_4^-$, PF$_6^-$, and CF$_3$SO$_3^-$. Concretely, lithium hexafluorophosphate or lithium tetra-fluorophosphate is used as the electrolytic salt in a concentration such that it can be dissolved in the electrolytic solution.

As illustrated in FIG. 7, the pack 23 which accommodates the battery element 20 therein is formed by cutting a cell aggregate 27 having a substantially rectangular accommodating sheet 24 in which plural accommodating concaves 25 for accommodating the battery element 20 therein are arranged in advance and a sealing sheet 26 as welded on the accommodating sheet 24 in which the battery element 20 is accommodated and capable of sealing each of the accommodating concaves 25 for every battery element 20.

The accommodating sheet 24 is formed in a longitudinal shape such that the plural accommodating concaves 25 are arranged via an overlap width 28 with a prescribed width. The accommodating concaves 25 are formed in a substantially rectangular shape depending upon the shape of the battery element 20. Furthermore, the arrangement direction of the accommodating concaves 25 is not limited to the direction of the short side as illustrated in FIG. 7, but the accommodating concaves 25 may be arranged in a direction of the long side or may be arranged lengthwise and crosswise. The overlap width 28 spacing the respective accommodating concaves 25 is a joining face of the sealing sheet 26 for sealing the accommodating concaves 25. Further, when the battery element 20 is accommodated in each of the accommodating concaves 25 as illustrated by an arrow A in FIG. 7, the sealing sheet 26 is heat welded on the overlap width 28, thereby forming the cell aggregate 27 having the battery elements 20 integrated therein.

Incidentally, at this time, the positive electrode terminal 21 and the negative electrode terminal 22 as extended from the positive electrode and the negative electrode are lead out in the same direction from the joining part with sealing sheet 26. Furthermore, at this time, evacuation is carried out simultaneously with the welding by using a vacuum pump (not illustrated). Due to this suction force, the battery element 20 is sealed in the accommodating concave 25 covered by the accommodating sheet 24 and the sealing sheet 26. Moreover, by sucking the inside of the accommodating concave 25, the pack 23 for accommodating the battery element 20 therein is drawn and squeezed and is formed in a substantially trapezoidal shape with respect to the cross section thereof such that an edge in each side of the short sides is formed in a circular arc shape, in which a second face side which is the bottom face side of the accommodating concave 25 is small, whereas a first face side which is the opening side is large, depending upon the shape of the battery element 20.

Furthermore, in the battery cell 3, a clearance is provided between the battery element 20 and the accommodating sheet 24 in such a manner that the battery element 20 is not pressed against the side face of the accommodating concave 25. Further, when the accommodating sheet 24 and the sealing sheet 26 are sealed while being drawn as squeezed, the concave 29 is formed on each of the lead-out face 3a of the battery cell 3 from which the positive electrode terminal 21 and the negative electrode 22 are lead out and a face 3b in the opposite side thereto (see FIG. 6). Moreover, after sealing the accommodating sheet 24 and the sealing sheet 26, in each of the battery cells 3, the principal face in the side of the sealing sheet 26 is formed in a flat shape by pressing. Thereafter, the cell aggregate 27 is cut along the overlap width 28 and separated every pack 23 having the battery element 20 sealed therein, thereby forming the battery cells 3.

Incidentally, in addition to the formation of the battery cell 3 by forming the cell aggregate 27 and cutting it along the overlap width 28, the battery cell 3 may be formed by accommodating the battery element 20 in a previously cut accommodating sheet for every individual battery cell and joining with a sealing sheet which is similarly cut for every individual battery cell.

Figure 8:
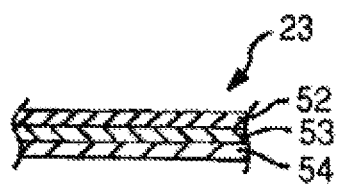
FIG. 8 is a cross-sectional view to show the structure of a pack of a battery cell.

Each of the accommodating sheet 24 and the sealing sheet 26 which configure the pack 23 has a stack structure in which a polypropylene (PP) layer 52, an aluminum (Al) layer 53, and a nylon layer 54 are stacked in this order from the inside as illustrated in FIG. 8. Here, the aluminum layer 53 is used for the purpose of preventing the invasion of moisture into the pack 23 and preventing the expansion of the battery element 20. Furthermore, the polypropylene layer 52 not only prevents the denaturation of the polymer electrolyte but also becomes a joining face between the accommodating sheet 24 and the sealing sheet 26. That is, joining of the accommodating sheet 24 and the sealing sheet 26 is carried out by opposing the polypropylene layers 52 to each other and heat melting them at about 170.degree. C.

Incidentally, the configuration of the pack 23 is not limited thereto, but laminate films having various materials and stack structures and the like can be employed. Furthermore, the joining method is not limited to the heat melting. Examples of the configuring material of the pack 23 include aluminum, polyethylene terephthalate (PET), non-axially stretched polypropylene (CPP), acid-modified polypropylene, ionomers, and ON.

The first battery lid 4 having a terminal part to be connected to the positive electrode terminal 21 and the negative electrode terminal 22 which are lead out from the same side face of the battery cell 3 and plugging the first opening 5 of the battery can 2 is configured to have a holder 30 for inserting and holding the positive electrode tab 31 and the negative electrode tab 32 which are connected to the positive electrode terminal 21 and the negative electrode terminal 22, respectively, the substrate 35 provided with the positive electrode terminal board 33 and the negative electrode terminal board 34 which are connected to the positive electrode tab 31 and the negative electrode tab 32, respectively, and the top cover 36 which sandwiches the holder 30 together with the substrate 35 and which is engaged with the first opening 5 of the battery can 2 and is manufactured by integrally assembling the folder 30, the substrate 35 and the top cover 36 as illustrated in FIG. 3.

The holder 30 is coupled with the top cover 36 via the substrate 35, thereby sandwiching the substrate 35 together with the top cover 36. In this way, the holder 30 receives a pressing pressure which is applied to the positive electrode terminal part 37 and the negative electrode terminal part 38 together with the top cover 36, thereby preventing a situation that an excessive load is applied to the positive electrode terminal part 37 and the negative electrode terminal part 38. The holder 30 is a component as formed in a substantially trapezoidal flat plate shape such that an edge in each side of the short sides is formed in a circular arc shape, which is prepared by mold forming a synthetic resin in substantially the same shape as the first opening 5 of the battery can 2. In this holder 30, a pair of insertion holes 41, 42 through which the positive electrode tab 31 and the negative electrode tab 32 are inserted, respectively are formed in the vicinity of the side faces of the sides of the short sides, and by inserting and holding the positive electrode tab 31 and the negative electrode tab 32 in the insertion holes 41, 42, respectively, it is devised to position the positive electrode tab 31 and the negative electrode tab 32 and also to prevent falling of the secondary battery 1 or position deviation as caused following the vibration or the like. Accordingly, the positive electrode tab 31 and the negative electrode tab 32 are able to prevent a situation that welding between the positive electrode terminal 21 and the negative electrode terminal 22 comes out due to falling or position deviation as caused following the vibration or the like.

The positive electrode tab 31 and the negative electrode tab 32 are provided for the purpose of connecting the positive electrode terminal 21 and the negative electrode terminal 22 which are lead out from the battery cell 3 to the positive electrode terminal board 33 and the negative electrode terminal board 34 as provided in the substrate 35 which becomes an electrode terminal of the secondary battery 1, and when inserted and supported in the holder 30, one ends 31 a, 32a are extended to the side of the battery cell 3, whereas the other ends 31 b, 32b are extended and held in the side of the substrate 35. In these positive electrode tab 31 and negative electrode tab 32, by using nickel (Ni), the one ends 31a, 32a are disposed on the positive electrode terminal 21 and the negative electrode terminal 22, respectively, the other ends 31 b, 32b are disposed on the positive electrode terminal board 33 and the negative electrode terminal board 34 as provided on the substrate 35, respectively, and four points are then welded collectively by spot welding. This is because since the positive electrode terminal 21 is formed by using aluminum (Al), if the positive electrode terminal 21 is welded directly to the positive electrode terminal board 33, the aluminum is molten so that the connection cannot be achieved. Accordingly, by mediating the positive electrode tab 31 and the negative electrode tab 32 and carrying out welding from the upper side, the positive electrode terminal 21 is connected to the positive electrode terminal board 33, and the negative electrode terminal 22 is connected to the negative electrode terminal board 34.

Figure 9:
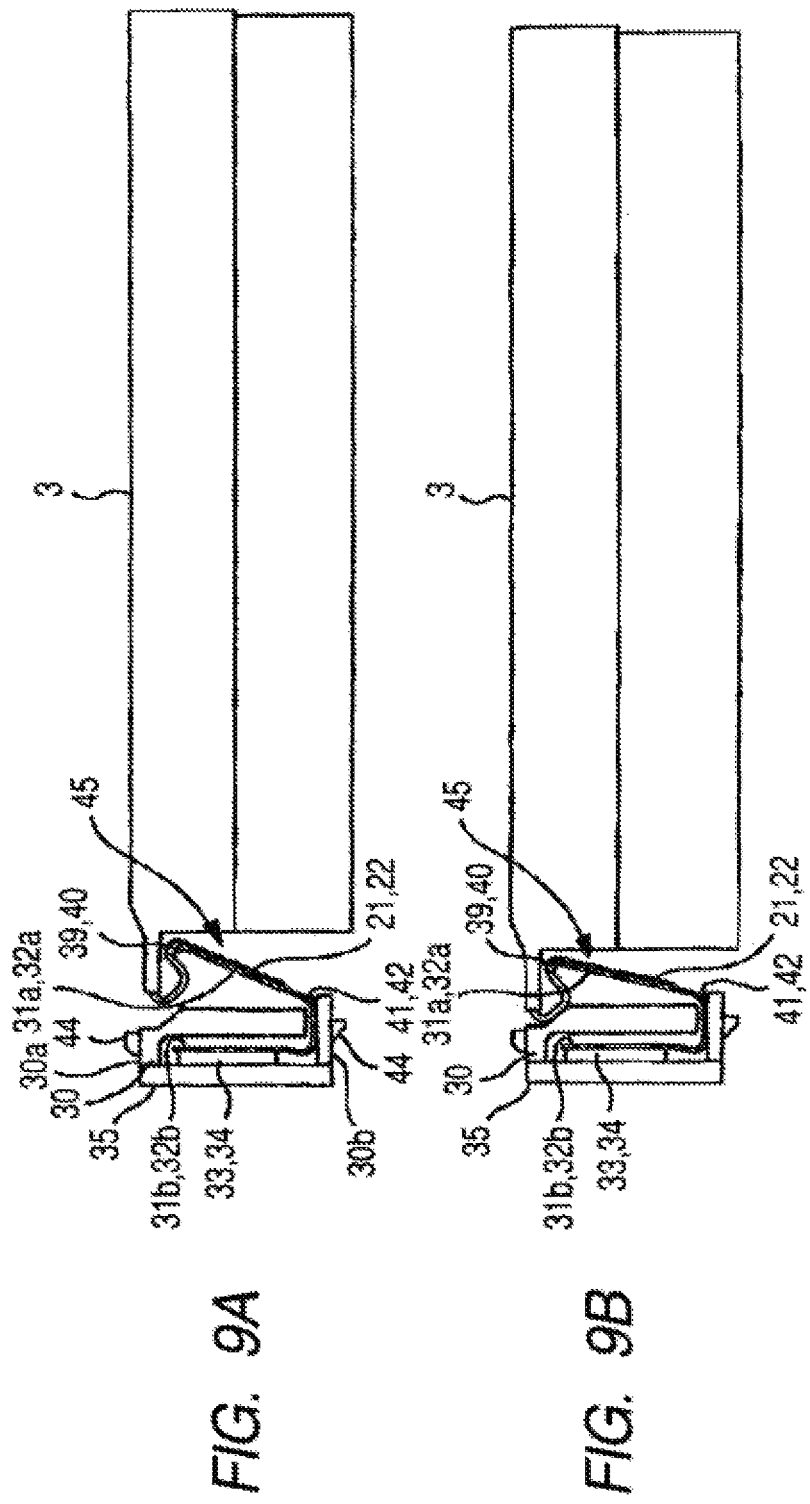
FIGS. 9A-9B are side views to show joining among a positive electrode terminal and a negative electrode terminal of a battery cell and a positive electrode tab and a negative electrode tab.
FIG. 9C is a front view.
Figure 10:
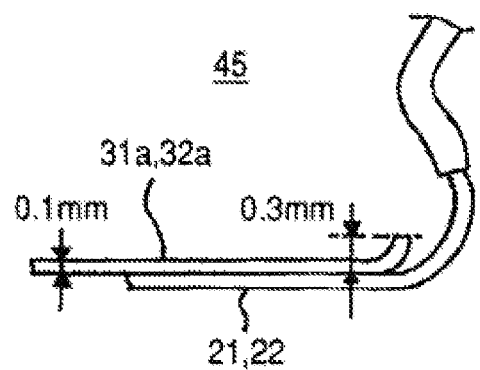
FIG. 10 is a side view to show a joining part among a positive electrode terminal and a negative electrode terminal and a positive electrode tab and a negative electrode tab.

Furthermore, as illustrate in FIGS. 9A and 9B, in the respective one ends 31a, 32a of the positive electrode tab 31 and the negative electrode tab 32, folding parts 39, 40 in which tip edges thereof are folded towards the face in the opposite side to the contact face coming into contact with the positive electrode terminal 21 and the negative electrode terminal 22 are formed. In the folding parts 39, 40, as illustrated in FIG. 10, the positive electrode tab 31 and the negative electrode tab 32 each has a thickness of 0.1 mm, whereas the tip thereof is folded in a height of about 0.3 mm. In this way, by folding the tip side, the positive electrode tab 31 and the negative electrode tab 32 are each made to stand up in a circular arc shape and joined with the positive electrode terminal 21 and the negative electrode terminal 22, respectively as described later. Thereafter, when a joining part 45 is folded, even in the case where the tip comes into contact with the positive electrode terminal 21 or the negative electrode terminal 22, it is possible to prevent the generation of a situation that the positive electrode terminal 21 or the negative electrode terminal 22 is damaged or cut.

Incidentally, an earth 43 for discharging an electric charge as charged on the battery can 2 is connected to the negative electrode tab 32. When the earth 43 is supported by the holder 30, one end thereof can be connected to the negative electrode tab 32, whereas the other end can be brought into contact with the inner surface of the battery can 2. In this way, even in the case where an electric charge is charged on the metallic battery can 2, the electric charge can be discharged into the negative electrode tab 32 through the earth 43 so that there is no possibility for causing an erroneous operation of a microcomputer within the secondary battery 1 or an electronic appliance having the secondary battery 1 installed therein due to the electric charge as charged on the battery can 2. Incidentally, the earth may be connected to the substrate 35, thereby discharging an electric charge into the negative electrode tab 32 through the substrate 35.

Furthermore, on upper and lower faces 30a, 30b of the holder 30, plural coupling projections 44 which are inserted and engaged in coupling holes 46 as provided on the top cover 36 are intermittently formed over the longitudinal direction. When the coupling projections 44 are engaged in the coupling holes 46, the holder 30 is coupling with the top cover 36, thereby sandwiching the substrate 35.

The substrate 35 is a rigid substrate on which a circuit pattern for supplying an electric current flowing from the battery cell 3 into an electronic appliance via the positive electrode terminal board 33 and the negative electrode terminal board 34 is formed and mounted with the positive electrode terminal board 33 and the negative electrode terminal board 34 which are welded to the other ends 31b, 32b of the positive electrode tab 31 and the negative electrode tab 32, respectively. The positive electrode terminal board 33 and the negative electrode terminal board 34 are connected to the positive electrode terminal part 37 and the negative electrode terminal part 38, respectively as formed on the face in the opposite side to the mounting face. Further, in the substrate 35, the positive electrode terminal part 37 and the negative electrode terminal part 38 are faced outwardly via the terminal holes 48 as provided on the top cover 36 and brought into contact with the electrode terminals as provided in the side of the digital still camera 10 or the battery charger.

The positive electrode terminal part 37 and the negative electrode terminal part 38 are formed in a different arrangement from each other depending upon the function of the secondary battery 1. The reasons for this are as follows. In the secondary battery 1 which is used in various electronic appliances, there is some case where nevertheless the external shape is identical with respect to the battery can 2 or the first battery lid 4, by making the battery capacity different depending upon an electronic appliance to be used, or by making a compatible electronic appliance different, plural types of the secondary batteries 1 which are incompatible with each other are provided. Furthermore, there is some case where there are provided a plural number of the secondary batteries 1 having a different function from each other such as a combination of a type provided with a residual battery life display part such as an LED display part or a liquid crystal display part and a residual battery life display button, thereby bringing a residual battery life display function and a type not having such a residual battery life display function; and a combination of a type which is able to achieve quick recharge and a type which is not able to achieve quick recharge.

However, since the external shape of the secondary battery 1 is identical in all types having any function, there is some possibility that the secondary battery 1 is installed in an incompatible electronic appliance. Then, by making the arrangement of the positive electrode terminal part 37 and the negative electrode terminal part 38 different for every function and similarly making the arrangement of electrode terminals of a compatible electronic appliance different, it becomes possible to prevent any trouble as caused due to erroneous installation of the secondary battery.

Figure 11A:
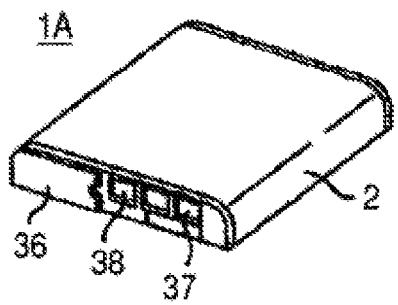
FIGS. 11A-11B are oblique views to show a secondary battery in which the arrangement of a positive electrode terminal part and a negative electrode terminal part is made different depending upon the function.
Figure 11B:
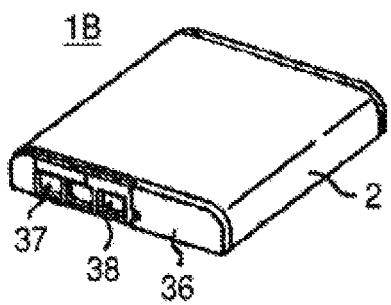
Figure 12A:
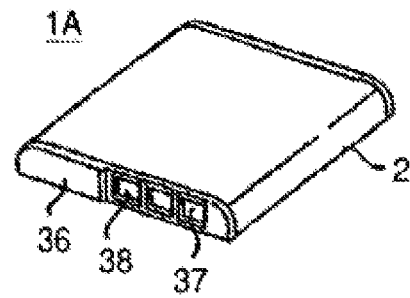
FIGS. 12A-12B are oblique views to show other secondary battery in which the arrangement of a positive electrode terminal part and a negative electrode terminal part is made different depending upon the function.
Figure 12B:
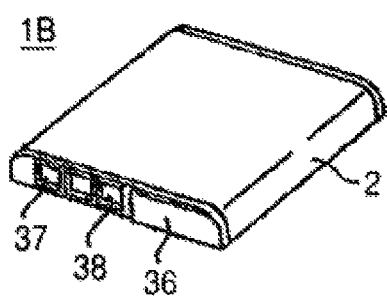

Concretely, the positive electrode terminal part 37 and the negative electrode terminal part 38 are arranged in a position of substantial point symmetry for every function. For example, in a secondary battery 1 A having a battery capacity of 760 mAh as illustrated in FIG. 11 A and a secondary battery 1B having a high battery capacity of 830 mAh as illustrated in FIG. 11 B, the positive electrode terminal part 37 and the negative electrode terminal part 38 are arranged in a position of substantial point symmetry as rotated through 180 degrees. Incidentally, the positive electrode terminal part 37 and the negative electrode terminal part 38 may be arranged in a position of bilateral symmetry for every function as illustrated in FIGS. 12A and 12B. Furthermore, the arrangement shape of substantial point symmetry can be properly selected.

In this way, by making the arrangement of the positive electrode terminal part 37 and the negative electrode terminal part 38 different depending upon the function of the secondary battery 1 and making the arrangement of electrode terminals of an electronic appliance corresponding to the function different, even in the case where the secondary battery 1 is installed in an incompatible electronic appliance, since the electrode terminals in the electronic appliance side do not come into contact with the electrode terminals in the side of the secondary battery 1, it is possible to prevent any trouble as caused due to erroneous installation of the incompatible secondary battery 1.

In the substrate 35, a circuit pattern and a land are formed by etching with a copper foil as stuck on an insulating substrate or the like, and the positive electrode terminal board 33 and the negative electrode terminal board 34 are mounted on the land by reflow soldering. As described previously, the positive electrode terminal board 33 and the negative electrode terminal board 34 are soldered on the positive electrode tab 31 and the negative electrode tab 32 together with the positive electrode terminal 21 and the negative electrode terminal 22, respectively. Furthermore, the positive electrode terminal part 37 and the negative electrode terminal part 38 are formed on the land as formed in a prescribed place by gilding or the like.

Incidentally, if desired, the substrate 35 may be provided with a heat-sensitive element such as PTC (positive temperature coefficient) for detecting the temperature of the secondary battery 1 to achieve charge control or safety control. By providing a heat-sensitive element, when the temperature is elevated, the secondary battery 1 is able to shut and control an input/output circuit.

The top cover 36 which sandwiches the substrate 35 together with the holder 30 is a component in a substantially trapezoidal flat plate shape such that an edge in each side of the short sides is formed in a circular arc shape, which is prepared by mold forming a synthetic resin in substantially the same shape as the first opening 5 of the battery can 2, and is able to be engaged with the first opening 5 without a gap. In the top cover 36, on an upper face 36a in the side of the short side and a lower face 36b in the side of the long side, plural coupling holes 46 in which plural coupling projections 44 as projected on the holder 30 are inserted and engaged are intermittently formed corresponding to the coupling projections 44. Furthermore, in the top cover 36, the plural engagement convexes 47 which are engaged with the engagement holes 6 as formed in the periphery of the first opening 5 of the battery can 2 are formed on the upper face 36a and the lower face 36b. Further, when the top cover 36 is inserted into the battery can 2 from the first opening 5 in such a manner that the upper face 36 a and the lower face 36b are slightly warped, the engagement convexes 47 are engaged with the engagement holes 6 and assembled in the battery can 2.

Furthermore, in the top cover 36, the terminal holes 48 from which the positive electrode terminal part 37 and the negative electrode terminal part 38 as formed in the substrate 35 are faced outwardly are perforated on the front face 36c, and the positive electrode terminal part 37 and the negative electrode terminal part 38 are brought into contact with the electrode terminals in the side of an electronic appliance such as the digital still camera 10 or the battery charger via the terminal holes 48. Incidentally, the terminal hole 48 is, for example, provided in three places depending upon the terminal part as formed in the substrate 35 and can be made to work for a positive electrode terminal, a negative electrode terminal and for a terminal for information such as residual battery life, respectively. Incidentally, the number of the terminal holes 48 can be properly increased or decreased depending upon the terminal part as provided in the substrate 35.

When the positive electrode terminal 21 and the negative electrode terminal 22 of the battery cell 3 are connected to the positive electrode terminal board 33 and the negative electrode terminal board 34 of the substrate 35 via the positive electrode tab 31 and the negative electrode tab 32 as held in the holder 30, respectively and the coupling projections 44 of the holder 30 are then inserted into the coupling holes 46, the top cover 36 is coupled with the holder 30 while sandwiching the substrate 35 therebetween, thereby forming the first battery lid 4. Thereafter, when the engagement convexes 47 of the top cover 36 are engaged with the engagement holes 6 as formed in the periphery of the first opening 5 of the battery can 2, the first battery lid 4 is assembled in the battery can 2, thereby forming the secondary battery 1.

Figure 13A:
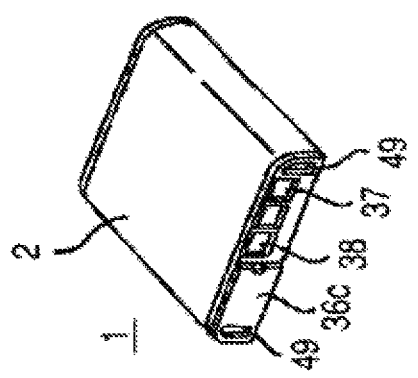
FIGS. 13A-13C are oblique views to show other example of a secondary battery to which the invention is applied.
Figure 13B:
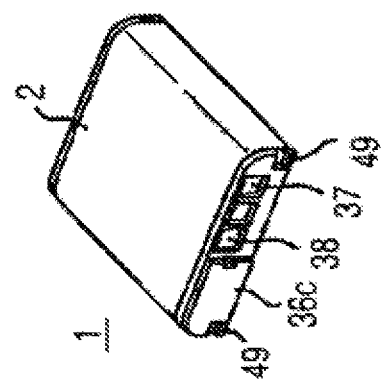
Figure 13C:
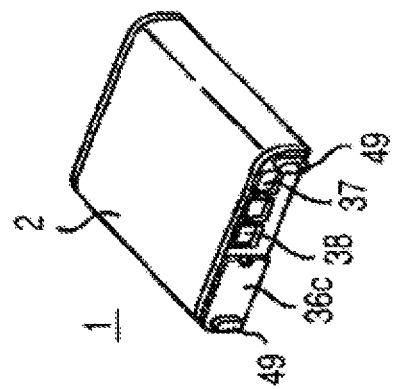

Incidentally, in the top cover 36, as illustrated in FIGS. 13A, 13B and 13C, in the case where it is externally attached in a battery installing part as formed in the casing of an electronic appliance separately from the battery accommodating part 12 on the front face 36c or in the case where it is installed in a battery installing part of the battery charger, engagement parts 49 which are engaged with engagement projections 78 as projected in the battery installing part of the electronic appliance or the battery charger may be formed. In the secondary battery 1, as illustrated in FIGS. 14A, 14B and 14C, the battery can 2 is installed by engaging the engagement parts 49 with the engagement projections 78 and then engaging an engagement part 55 as formed in the second battery lid 8 as described later with an engagement member 51. The engagement parts 49 can be easily formed in mold forming the top cover 36. Incidentally, FIG. 13A shows an example in which the engagement parts 49 are formed in a concave form in the both ends of the front face 36c of the top cover 36; FIG. 13B shows an example in which the both ends of the engagement parts 49 in a concave form are notched; and FIG. 13C shows an example in which engagement concaves are provided in the battery installing part, and convex engagement parts 49 provided with a shape corresponding to the engagement convexes are formed in the top cover 36 of the secondary battery 1.

Incidentally, in this specification, with respect to the secondary battery 1, the principal face in the side of the short side of the battery can 2 is referred to as the upper face 1a of the secondary battery 1; the principal face on the side of the long side of the battery can 2 is referred to as the lower face 1b of the secondary battery 1; the front face 36c of the top cover 36 is referred to as the front face 10 of the secondary battery 1; and the bottom face part of the battery can 2 is referred to as the back face 1d of the secondary battery 1.

Next, the second battery lid 8 which is opposing to the side face in the opposite side to the lead-out face 3a from which the positive electrode terminal 21 and the negative electrode terminal 22 of the battery cell 3 are lead out and which plugs the second opening 7 of the battery can 2 will be described. This second battery lid 8 is a component in a substantially trapezoidal flat plate shape such that an edge in each side of the short sides is formed in a circular arc shape, which is prepared by mold forming a synthetic resin in substantially the same shape as the second opening 7 of the battery can 2 and is able to be engaged with the second opening 7 without a gap.

Furthermore, in the second battery lid 8, plural engagement convexes 50 with which the engagement holes 9 as formed in the periphery of the second opening 7 of the battery can 2 are engaged are intermittently formed on an upper face 8a and a lower face 8b thereof. When the upper face 8a and the lower face 8b of the second battery lid 8 are inserted into the battery can 2 from the second opening 7 while being warped, the engagement convexes 50 are engaged with the engagement holes 9, whereby the second battery lid 8 is assembled to the battery can 2. In this way, the second battery lid 8 is assembled in the battery can 2.

Furthermore, in the second battery lid 8, one end part of a front face 8d is formed as an engagement part which is engaged with the engagement member 19 as provided in the battery accommodating part 12 of the digital still camera 10. That is, as illustrated in FIGS. 15A and 15B, the front face 8d is formed as an engagement region with which the engagement member 19 in a hook shape for holding the battery can 2 in the battery accommodating part 12 of the digital still camera 10 is engaged, and in installing the secondary battery 1, the engagement member 19 is engaged. In this way, the secondary battery which is always energized towards the outside of the battery accommodating part 12 by an energizing members is engaged with the battery accommodating part 12 in opposition to the energizing force. Furthermore, when the engagement member 19 comes off from the front face 8d, the secondary battery 1 is discharged from the battery accommodating part 12.

Furthermore, even in the case where the secondary battery 1 is installed in an electronic appliance such as the digital still camera 10 or a battery charger from the bottom face part in the erroneous insertion direction, since the electrodes in the side of the digital still camera 10 or the battery charger as provided corresponding to the positions of the positive electrode terminal part 37 and the negative electrode terminal part 38 come into contact with the synthetic resin-made second battery lid 8 which configures the bottom face part of the secondary battery 1, it is possible to prevent a short circuit as caused due to the direct contact with the metallic battery can from occurring different from a secondary battery in which the bottom face part is formed integrally with the metallic battery can.

Furthermore, when the battery cell 3 is inserted into the battery can 2, the second battery lid 8 is adhered to the end face 3b into which the battery cell 3 is inserted via an elastic member 60 as described later. In this way, since the battery cell 3 is adhered to the inside of the battery can 2, unsteadiness within the battery can 2 is prevented from occurring. Furthermore, it is possible to absorb an impact which is applied to the battery cell 3 due to falling or vibration of the secondary battery 1 or the like. Also, it is possible to prevent a situation that an excessive load is applied to a joining part 45 among the positive electrode terminal 21 and the negative electrode terminal 22 and the positive electrode tab 31 and the negative electrode tab 32.

Incidentally, in the case where the second battery lid 8 which configures the bottom face part of the battery can 2 is externally attached in a battery installing part as formed in the casing of an electronic appliance separately from the battery accommodating part 12 or is installed in a battery installing part of a battery charger as illustrated in FIGS. 16A and 16B, an engagement part 55 to be engaged with an engagement member 51 as projected in the battery installing part of the electronic appliance or the battery charger may be formed as illustrated in FIGS. 14A, 14B and 14C.

For example, this engagement part 55 is formed in a substantially rectangular concave along the longitudinal direction and formed at the same time when the second battery lid 8 is mold formed. For example, the engagement part 55 is formed in the battery installing part as provided in an external casing of an electronic appliance as illustrated in FIG. 14A and engaged with the engagement member 51 in a hook shape as rotated and energized towards the side of the engagement part 55. Incidentally, FIG. 16A is a view to show an example in which the concave engagement part 55 is formed over the full length in a longitudinal direction of the second battery lid 8; and FIG. 16B is a view to show an example in which a pair of engagement parts 55, 55 are formed in the both end parts in a longitudinal direction of the second battery lid 8.

As illustrated in FIGS. 14B and 14C, after the engagement parts 49 as formed in the foregoing first battery lid 4 are engaged with the engagement projections 78, the engagement part 55 is engaged with the engagement member 51 as rotated and energized towards the engagement direction of the battery can 2. Thus, the secondary battery 1 can be externally attached to the outside of a casing of an electronic appliance or the like. In this way, besides the secondary battery 1 as accommodated in the installing accommodating part, another secondary battery 1 can be externally attached in the electronic appliance with ease so that the time for use of the electronic appliance can be prolonged.

The engagement part 55 can be properly formed in an arbitrary shape without being limited to the examples as illustrated in FIGS. 16A and 16B. Furthermore, an engagement part 55 in a convex form may be formed such that a concave engagement member is provided in the side of the battery installing part and that the second battery lid 8 has a shape corresponding to this engagement member.

Incidentally, as illustrate in FIG. 6, since a concave 29 is formed on an insertion end face 3b of the battery cell 3 as described later, when this engagement hole 8 is formed corresponding to the concave 29, it is formed without interfering with a battery element 20 which is configured to have a positive electrode, a negative electrode and an electrolyte as accommodated within the battery cell 3.

Next, the manufacturing process of the secondary battery 1 will be described below with reference to FIGS. 17A to 17L. First of all, as illustrated in FIG. 17A, the battery cell 3 and the substrate 35 are arranged in a jig, the details of which are omitted. Incidentally, at this time, the battery cell 3 is cut along the overlap width 28 of the cell aggregate 27 and folded along the side face of the battery cell 3 into a substantially trapezoidal shape with respect to the cross section thereof, thereby making it easy for handling; and as described later, in accommodating in the battery can 2, when the folded overlap width 28 is arranged between the side face of the battery can 2 and the battery cell 3, it functions as a buffer member. Furthermore, in the substrate 35, a prescribed circuit pattern and the positive electrode terminal part 37 and the negative electrode terminal part 38 are formed, and the positive electrode terminal board 33 and the negative electrode terminal board 34 are reflow soldered.

Incidentally, with respect to the formation of the battery cell 3, in addition to the case of forming the cell aggregate 27 and cutting it along the overlap width 28, a sealing sheet may be joined with an accommodating sheet having the battery element 20 accommodated therein for every individual battery cell.

The battery cell 3 is arranged in such a manner that the joining face between the accommodating sheet 24 from which the positive electrode terminal 21 and the negative electrode terminal 22 are lead out and that the sealing sheet 26 are faced upwardly and that the bottom part of the accommodating concave 25 is faced downwardly. That is, the battery cell 3 in a substantially trapezoidal form with respect to the cross section thereof is arranged in such a manner that the side of the short side is faced downwardly and that the side of the long side from which the positive electrode terminal 21 and the negative electrode terminal 22 are lead out is faced upwardly. Furthermore, the battery cell 3 is arranged in such a manner that the lead-out face 3a from which the positive electrode terminal 21 and the negative electrode terminal 22 are lead out is faced towards the side of the substrate 35. The substrate 35 is arranged in such a manner that the mounting face on which the positive electrode terminal board 33 and the negative electrode terminal board 34 are mounted is faced upwardly and that the side of the short side in a substantially trapezoidal shape is faced towards the side of the lead-out face 3a of the battery cell 3.

Figure 18:
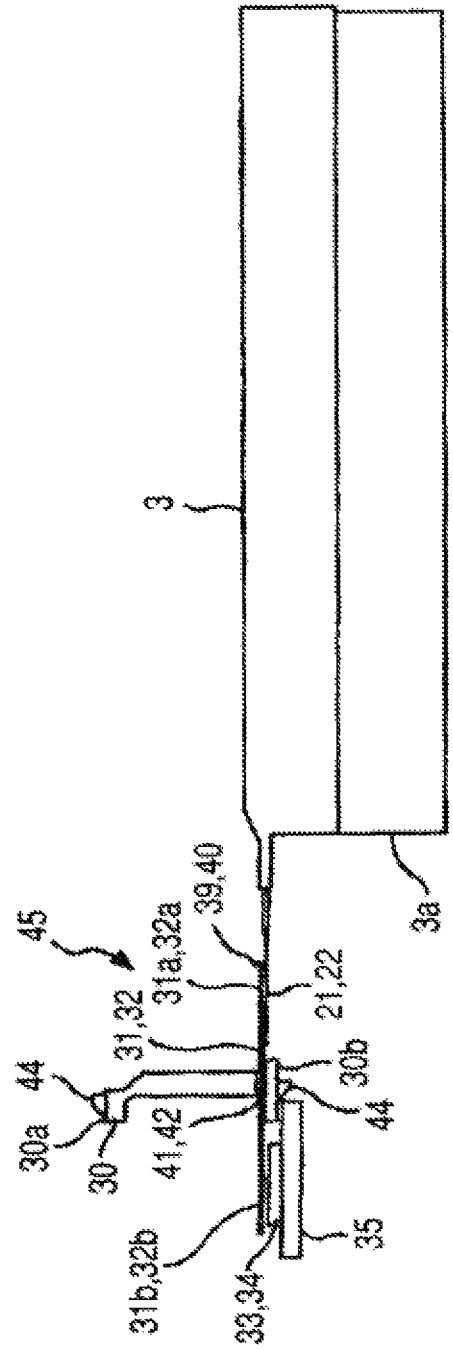
FIG. 18 is a side view to show a battery cell, a holder and a substrate as placed in a jig.

Next, as illustrated in FIG. 17B, in the holder 30, the positive electrode tab 31 and the negative electrode tab 32 are inserted in and held by the insertion holes 41, 42. Furthermore, at this time, the earth 43 is also installed in the holder 30. Next, as illustrated in FIG. 17C, by installing this holder 30 in a jig, the holder 30 is arranged between the battery cell 3 and the substrate 35. In the holder 30, the side of the short side in a substantially trapezoidal shape in which the positive electrode tab 31 and the negative electrode tab 32 are held is faced downwardly and positioned with the short side of the substrate 35. Furthermore, in the holder 30, the one end 31 a of the positive electrode tab 31 is superposed on the positive electrode terminal 21 of the battery cell 3, and the one end 32a of the negative electrode tab 32 is superposed on the negative electrode terminal 22. Moreover, the other end 31 b of the positive electrode tab 31 is superposed on the positive electrode terminal board 33 of the substrate 35, and the other end 32b of the negative electrode tab 32 is superposed on the negative electrode terminal board 34. In this way, the positive electrode terminal 21 and the negative electrode terminal 22 of the battery cell 3, the positive electrode tab 31 and the negative electrode tab 32 of the holder 30, and the positive electrode terminal board 33 and the negative electrode terminal board 34 of the substrate 35 are placed on substantially the same plane (see FIG. 18).

Next, four places of the one end 31 a and the other end 31 b of the positive electrode tab 31 and the one end 32a and the other end 32b of the negative electrode tab 32 are welded from the upper side, respectively, thereby joining the positive electrode terminal 21 of the battery cell 3 to the one end 31 a of the positive electrode tab 31, the negative electrode terminal 22 to the one end 32a of the negative tab 32, the positive electrode terminal board 33 of the substrate 35 to the other end 31 b of the positive electrode tab 31, and the negative electrode terminal board 34 to the other end 32b of the negative electrode tab 32, respectively. Here, though aluminum (Al) is used for the positive electrode terminal 21, since the positive electrode terminal 21 is welded from the upper side of the positive electrode tab 31 made of nickel, the both can be surely joined to each other without the generation of dissolution by heat.

Next, as illustrated in FIG. 17D, the substrate 35 is made to stand up, thereby superposing the holder 30 thereon. At this time, in the respective other ends 31 b, 32b of the positive electrode tab 31 and the negative electrode tab 32 which are held by the holder 30, the base end parts which are projected from the insertion holes 41, 42 in the side of the substrate 35 are folded along the standing-up direction of the substrate 35.

Next, as illustrated in FIG. 17E, insulating paper 59 is stuck so as to cover the joining part 45 among the positive electrode terminal 21 and the negative electrode terminal 22 and the one end 31a of the positive electrode tab 31 and the one end 32a of the negative electrode tab 32. The insulating paper 59 not only reinforces the joining part 45 among the positive and negative electrode terminals 21, 22 and the positive and negative electrode tabs 31, 32 but also prevents the generation of a short circuit due to the contact between the metallic battery can 2 and the joining part 45 and the generation of a short circuit between the positive electrode and the negative electrode due to deformation of the positive electrode tab 31 and the negative electrode tab 32. In the insulating paper 59, an adhesive layer is formed in the side of one face, and by folding the insulating-paper 59 while sandwiching the joining part 45 as illustrated in FIG. 17F, the adhesive layers are stuck to each other, thereby achieving sticking.

Next, as illustrated in FIG. 17G, the holder 30 is coupled with the top cover 36, thereby forming the first battery lid 4. Thereafter, as illustrated in FIG. 17H and FIGS. 9A and 9B, the joining part 45 among the positive electrode terminal 21 and the negative electrode terminal 22 and the positive electrode tab 31 and the negative electrode tab 32 and to which the insulating paper 59 is stuck is folded in a substantially S-shaped form such that the lead-out face 3a of the battery cell 3 and the first battery lid 4 are faced at each other. In this way, by accommodating the joining part 45 in a curved state, in the battery can 2, even in the case where an impact is applied between the battery cell 3 and the first battery lid 4 by falling, vibration, or the like, a load of the impact is absorbed by the joining part 45 as folded in a substantially S-shaped from and accommodated so that it is possible to prevent separation or breakage of the positive electrode terminal 21 and the negative electrode terminal 22 and the positive electrode tab 31 and the negative electrode tab 32 from occurring (see FIGS. 9A and 9B).

Next, as illustrated in FIG. 17I, in the battery cell 3, an elastic member 60 having a slight thickness and having an adhesive layer formed on the both sides thereof is stuck on the insertion end face 3b into the battery can 2. This elastic member 60 not only makes the battery cell 3 fix inside the battery can 2, thereby preventing unsteadiness but also absorbs an impact which is applied to the battery cell 3. Examples of the elastic member 60 include a pressure sensitive adhesive double coated tape using a polyurethane foam as a base material. The insertion end face 3b of the battery cell 3 is not formed in a flat shape and is a face in which the shape thereof is liable to be scattered. However, the scattering is absorbed by the elastic member 60 so that the battery cell 3 can be surely adhered to the inside of the battery can 2. Furthermore, the elastic member 60 can absorb an impact which is applied to the battery cell 3 due to falling, vibration, or the like or can reduce a load to the joining part 45 due to heat expansion of the battery cell 3. Thus, the elastic member 60 is able to prevent separation of the positive electrode terminal 21 and the negative electrode terminal 22 and the positive electrode tab 31 and the negative electrode tab 32 from occurring together with the foregoing insulating paper 59.

When the elastic member 60 is formed in a substantially rectangular shape depending upon the shape of the insertion end face 3b of the battery cell 3 and arranged in the both end parts in a longitudinal direction along the side face of the battery cell 3, an insulating film 61 for insulating the overlap width 28 of the battery cell 3 from the battery can 2 is stuck. That is, the accommodating sheet 24 and the sealing sheet 26 which configure the pack 23 of the battery cell 3 are each a sheet in which the polypropylene (PP) layer 52, the aluminum (Al) layer 53, and the nylon layer 54 are stacked in this order from the inside as described previously. When cut along the overlap width 28, the respective layers which configure the sheet are exposed outwardly on the cut face. Among them, when the aluminum layer 53 comes into direct contact with the metallic battery can 2, in the case where the battery can 2 is charged, the aluminum layer 53 becomes a genitive electrode. When the polypropylene layer 52 further has a hole due to some cause, the aluminum layer 53 has a hole by electrolytic corrosion. Further, there is some possibility that when moisture invades from the hole of the pack 23, the battery cell 3 is expanded. Then, by arranging the insulating film 61 along the cut face of the battery cell 3, it is devised to achieve insulation between the battery can 2 and the cut face of the pack 23, thereby preventing the expansion of the battery cell 3 due to moisture absorption of the battery element 20.

Figure 19:
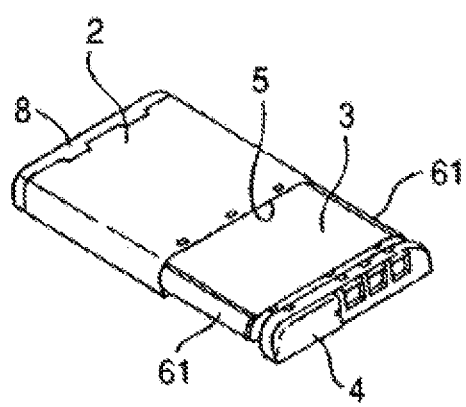
FIG. 19 is an oblique view to show a battery cell which is inserted into a battery can.
Figure 20:
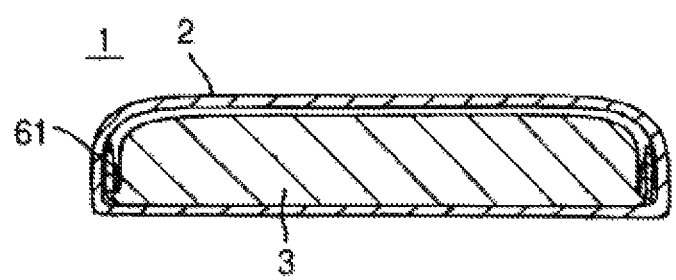
FIG. 20 is a cross-sectional view to show a secondary battery to which the invention is applied.

The insulating film 61 is a longitudinal film as formed depending upon the side face of the battery cell 3, one end of which is stuck to each of the end parts of the elastic member 60. As illustrated in FIGS. 19 and 20, when the battery cell 3 is inserted into the battery can 2 from the insertion end face 3b, the insulating film 61 is folded along the side face of the battery cell 3 by a side edge part of the first opening 5 of the battery can 2 and arranged between the cut face of the overlap width 28 as folded on the side face of the battery cell 3 and the side face of the battery can 2. In this way, it is possible to prevent the contact between the aluminum layer 53 as exposed on the cut face of the overlap width 28 and the battery can 2.

Figure 21A:
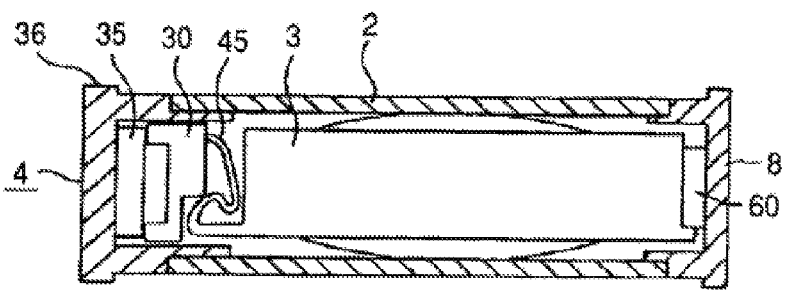
FIG. 21A-21C are cross-sectional views to show a state of a battery cell within a battery can.
Figure 21B:
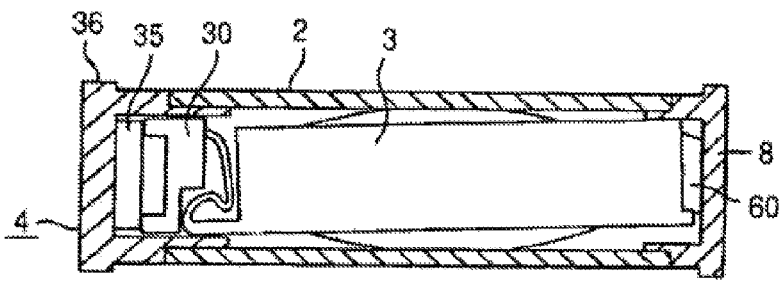
Figure 21C:
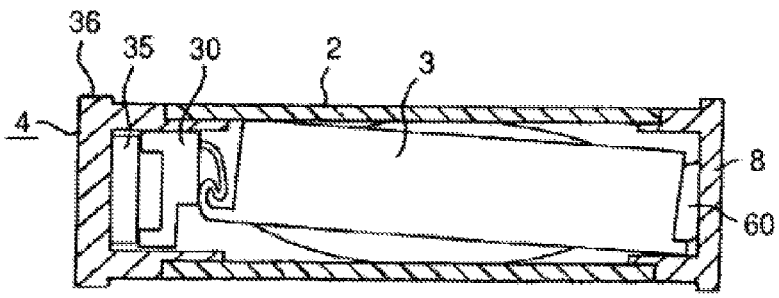
Figure 22A:
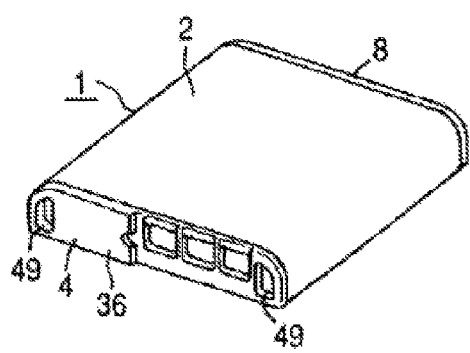
FIG. 22A-22H are views to show other example of a secondary battery to which the invention is applied.
Figure 22B:
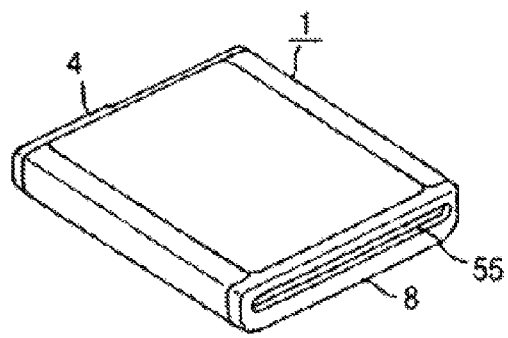
Figure 22C:
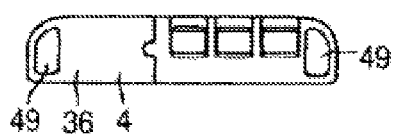
Figure 22D:
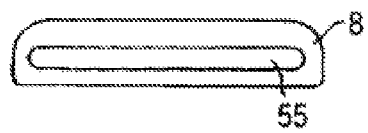
Figure 22E:
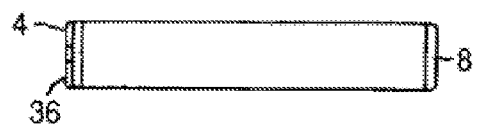
Figure 22F:
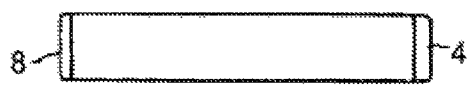
Figure 22G:
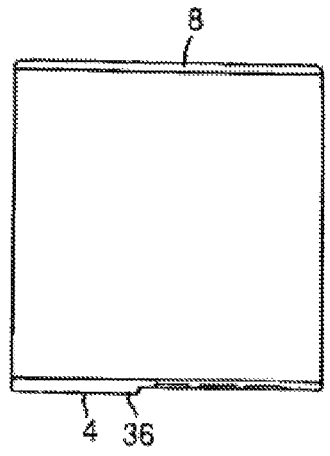
Figure 22H:
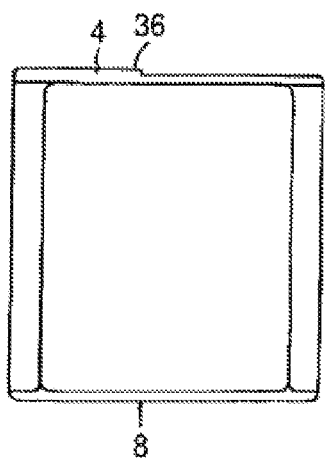
Figure 23A:
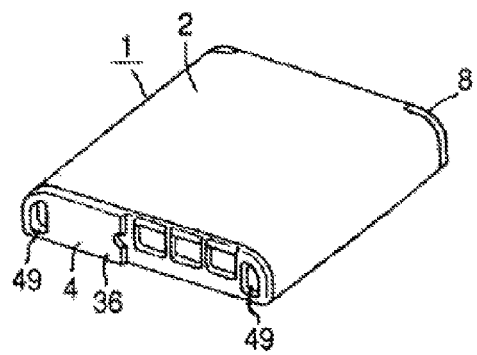
FIG. 23A-23H are views to show other example of a secondary battery to which the invention is applied.
Figure 23B:
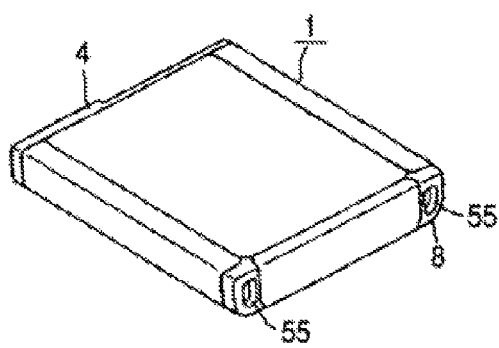
Figure 23C:
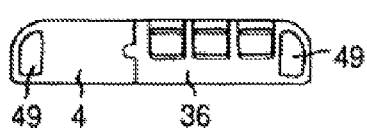
Figure 23D:
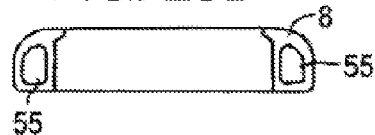
Figure 23E:
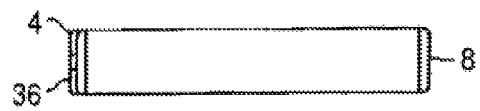
Figure 23F:
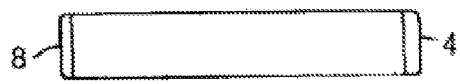
Figure 23G:
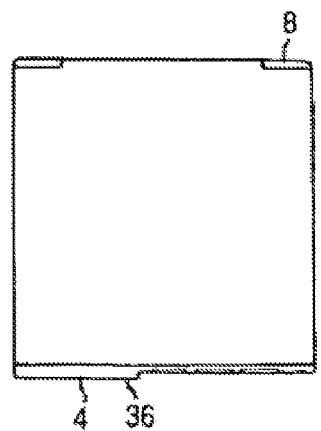
Figure 23H:
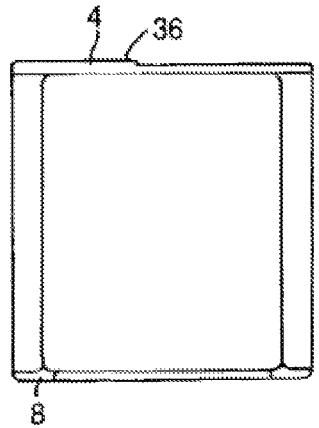
Figure 24A:
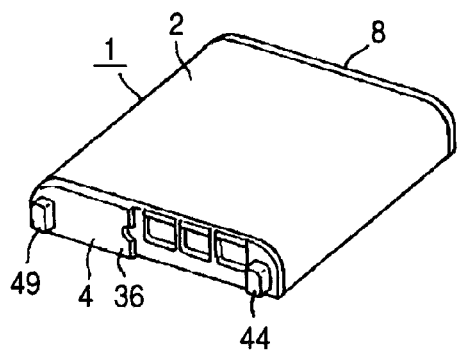
FIG. 24A-24H are views to show other example of a secondary battery to which the invention is applied.
Figure 24B:
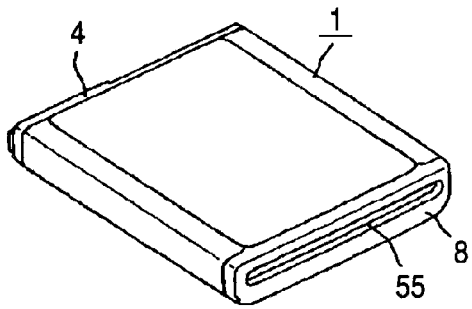
Figure 24C:
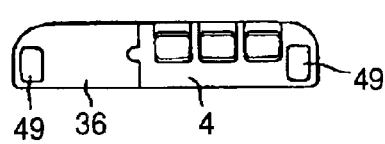
Figure 24D:
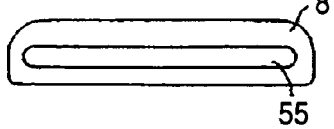
Figure 24E:
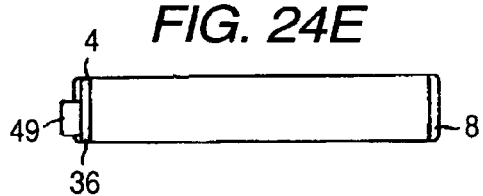
Figure 24F:
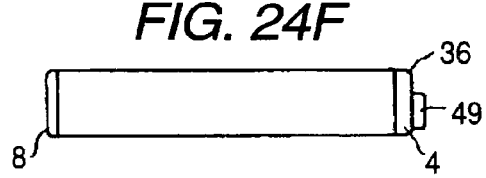
Figure 24G:
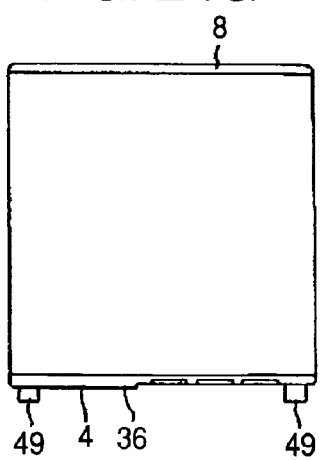
Figure 24H:
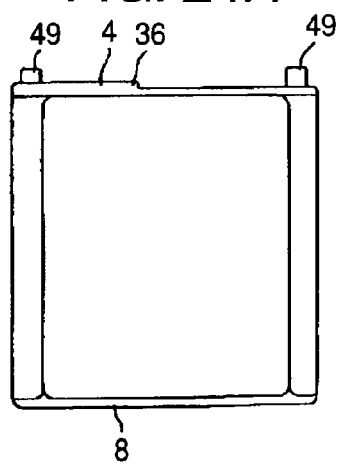
Figure 25A:
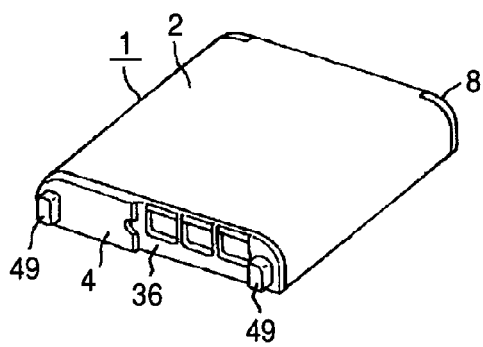
FIG. 25A-25H are views to show other example of a secondary battery to which the invention is applied.
Figure 25B:
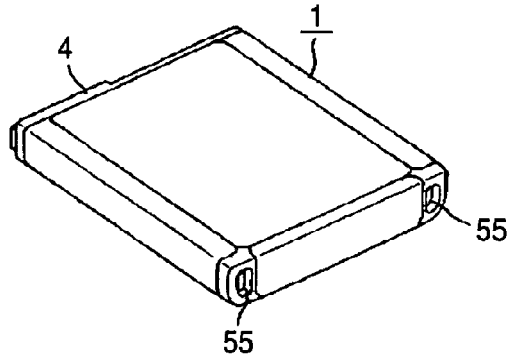
Figure 25C:
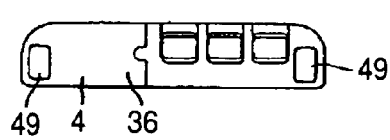
Figure 25D:
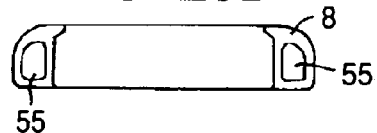
Figure 25E:
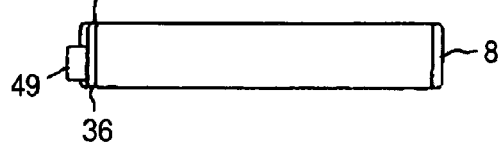
Figure 25F:
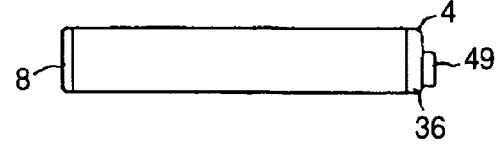
Figure 25G:
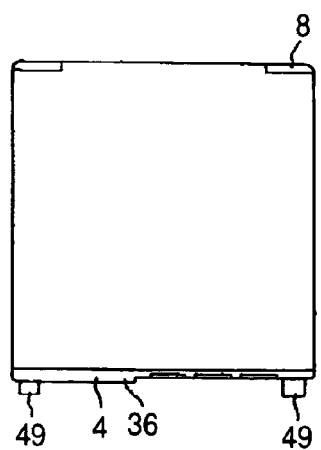
Figure 25H:
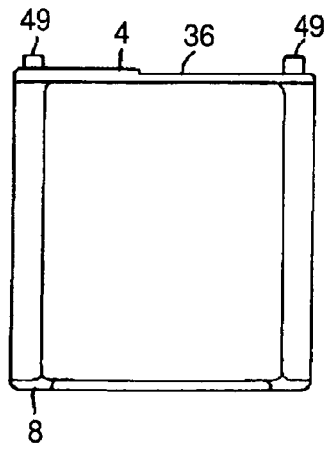
Figure 26A:
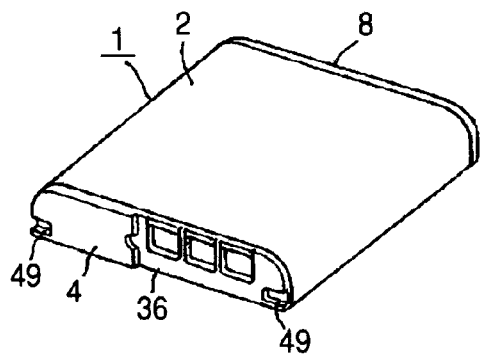
FIG. 26A-26H are views to show other example of a secondary battery to which the invention is applied.
Figure 26B:
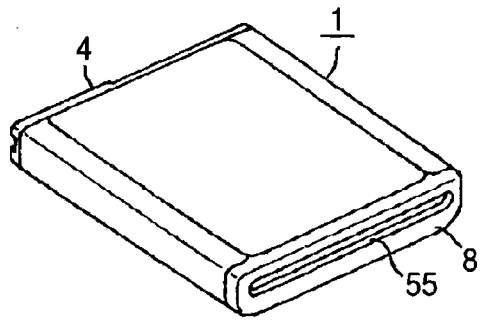
Figure 26C:
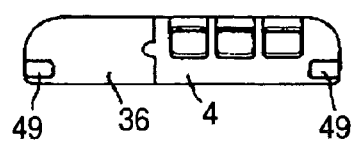
Figure 26D:
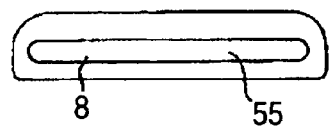
Figure 26E:
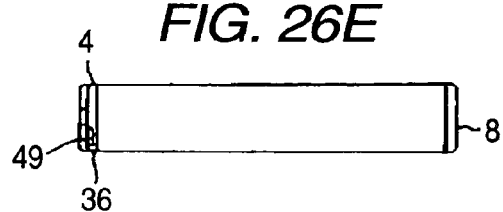
Figure 26F:
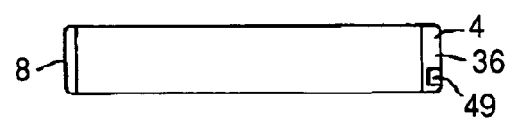
Figure 26G:
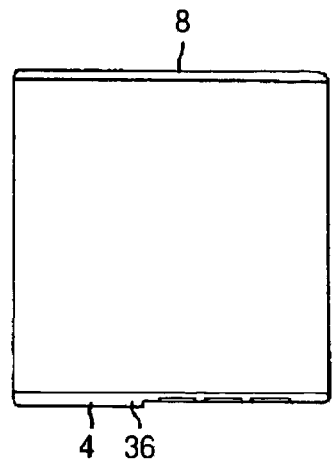
Figure 26H:
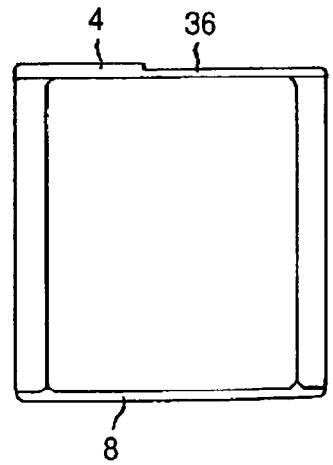
Figure 27A:
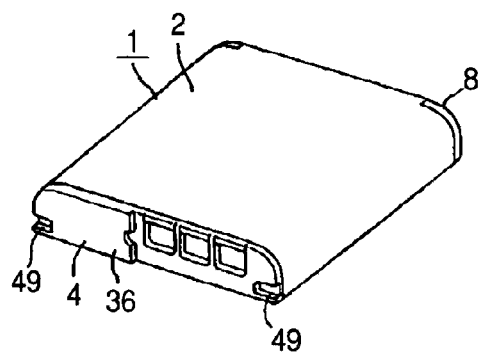
FIG. 27A-27H are views to show other example of a secondary battery to which the invention is applied.
Figure 27B:
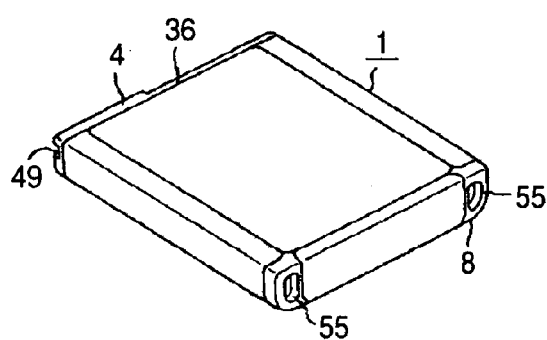
Figure 27C:
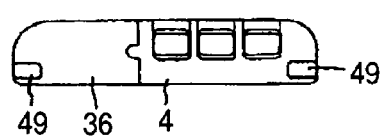
Figure 27D:
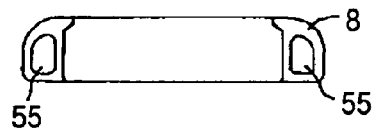
Figure 27E:
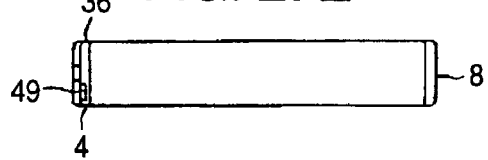
Figure 27F:
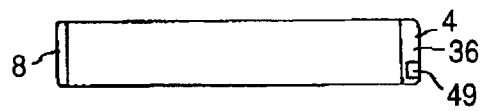
Figure 27G:
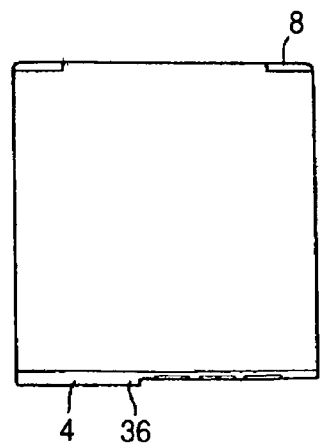
Figure 27H:
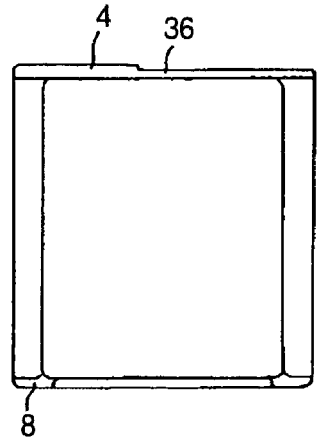

Next, as illustrated in FIG. 17J, the battery cell 3 is inserted into the battery can 2, and the first opening 5 of the battery can 2 is plugged by the first battery lid 4. At this time, in the battery can 2, the second battery lid 8 is previously assembled in the second opening 7. The battery cell 3 is inserted in such a manner that the side of the short side and the side of the long side of the substantially trapezoidal shape with respect to the cross section thereof are made adaptive with the side of the short side and the side of the long side of the battery can 2 as formed similarly substantially trapezoidal shape with respect to the cross section thereof. In this way, a space within the battery can 2 can be effectively utilized so that a prescribed clearance is provided between the battery can 2 and the battery cell 3. As illustrated in FIGS. 21A to 21C, this clearance becomes a margin in the case where the battery cell 3 is expanded by heat or the like so that an excessive load to the joining part 45 or deformation of the battery can 2 as caused due to the expansion of the battery cell 3 can be avoided. Incidentally, FIG. 21A shows the case where the both principal faces of the battery cell 3 are equally expanded; and each of FIGS. 21B and 21C schematically shows the case where the both principal faces of the battery cell 3 are unequally expanded.

Furthermore, in the case where the direction of the battery cell 3 is reversed, since the edge of each side of the long sides of the battery cell 3 interferes with the edge in a circular arc shape as formed in each side of the short sides of the battery can 2, thereby preventing the invasion, it is possible to prevent erroneous insertion from occurring.

As illustrated in FIG. 19, when the battery cell 3 is inserted, the insulating film 61 is arranged along the side face of the battery cell 3 by the side edge of the first opening 5 of the battery can 2. Furthermore, the battery cell 3 is adhered to an inner wall of the second battery lid 8 which configures the bottom face part of the battery can 2 by the elastic member 60 as stuck on the insertion end face 3b. Subsequent to the insertion of the battery cell 3, the engagement convexes 47 as projected on the top cover 36 invade into the first opening 5 while being warped and are then engaged with the engagement holes 6. In this way, the first battery lid 4 is assembled in the first opening 5 of the battery can 2.

Furthermore, when the first battery lid 4 is assembled in the battery can 2, the joining part 45 among the positive electrode terminal 21 and the negative electrode terminal 22 and the positive electrode tab 31 and the negative electrode tab 32 is arranged in a curved state in a substantially S-shaped form between the battery cell 3 and the holder 30.

Next, as illustrated in FIG. 17K, the external label 15 is stuck to the periphery of the battery can 2. Finally, as illustrated in FIG. 17L, the information label 16 on which a variety of information of the secondary battery 1 is described is stuck in the principal face part of the side of the long sides of the battery can 2 to which the external label 15 has been stuck, thereby completing the second battery 1.

According to the secondary battery 1 having the foregoing configuration, by assembling the metallic battery can 2 and the mold formed first battery lid 4 and second battery lid 8, assembling can be easily achieved. Furthermore, since the battery can 2 is formed by forming a metallic plate into a cylinder in a substantially trapezoidal shape with respect to the cross section thereof and cutting it in an arbitrary length corresponding to the shape of the battery cell 3, the secondary battery can be easily produced. That is, in the case where only the first opening 5 into which the battery cell 3 is inserted is opened, the battery can is manufactured by employing deep drawing processing. In this case, the manufacture of a mold costs a lot of money, and the manufacture and processing steps of the battery can become complicated. On the other hand, by employing the cylindrical battery can 2 as in the invention, it can be manufactured more simply by extrusion molding, and a degree of freedom of the design can be improved. Furthermore, the number of processing steps of the battery can 2 can be minimized. In addition, since the secondary battery can is manufactured by cutting a cylindrical metallic plate depending upon the shape of the battery cell, it is possible to easily manufacture the battery can 2 corresponding to plural kinds of battery cells having a different dimension.

Furthermore, by using the metallic battery can 2, slimming and insurance of strength can be achieved at the same time so that it is possible to provide a secondary battery which is able to meet the requirements for an electronic appliance such as downsizing, slimming and lightweight.

In addition, the external shape of the engagement part 49 or the engagement part 55 which becomes the installing end in installing the secondary battery 1 in a battery installing part of an electronic appliance can be easily formed by using the mold formed first battery lid 4 and second battery lid 8 (FIGS. 13A to 13C and FIGS. 16A and 16B). Incidentally, the external shape to be formed in these first battery lid 4 and second battery lid 8 can be used as a discrimination part for discriminating a function or attribute of the secondary battery 1 such as a battery capacity, the necessity of quick recharge, the presence or absence of a residual battery life display function. For example, by providing a convex control part in the front face 36*c* of the top cover of the first battery lid 4, it is possible to control the installation into an electronic appliance other than a compatible electronic appliance or the installation of a secondary battery which is incompatible with quick recharge into a battery charger which undergoes quick recharge of a secondary battery. Such a control part is formed in mold forming the first battery lid 4 and the second battery lid 8, and in an electronic appliance or a battery charger which is compatible with the secondary battery 1, a concave interfitting part corresponding to the control part is formed. In this way, it is possible to prevent the installation of a secondary battery into an incompatible electronic appliance or battery charger which is not provided with an interfitting part for interfitting the control part.

Incidentally, an oblique view of the secondary battery 1 provided with the engagement part 49 and the engagement part 55 is shown in each of FIGS. 22A and 22B, 23A and 23B, 24A and 24B, 25A and 25B, 26A and 26B, and 27A and 27B; a front view of the secondary battery 1 as illustrated in each of the oblique views is shown in each of FIGS. 22C, 23C, 24C, 25C, 26C and 27C; a back view of the subject secondary battery 1 is shown in each of FIGS. 22D, 23D, 24D, 25D, 26D and 27D; a left side view of the subject secondary battery 1 is shown in each of FIGS. 22E, 23E, 24E, 25E, 26E and 27E; a right side view of the subject secondary battery 1 is shown in each of FIGS. 22F, 23F, 24F, 25F, 26F and 27F; a plan view of the subject secondary battery 1 is shown in each of FIGS. 22G, 23G, 24G, 25G, 26G and 27G; and a bottom view of the subject secondary battery 1 is shown in each of FIGS. 22H, 23H, 24H, 25H, 26H and 27H.

Furthermore, in the secondary battery 1, when the battery can 2 and the first battery lid 4 and the second battery lid 8 are formed in a substantial trapezoidal shape with respect to the cross section thereof in which the edge of each side of the short sides is formed in a circular arc shape and the battery accommodating part 12 in the side of the digital still camera 10 is formed in the same shape, in the case where the insertion face is reversed in the back and front, the edges of the battery accommodating part 12 and the edges of the secondary battery 1 interfere with each other, thereby inhibiting the insertion. Thus, it is possible to surely prevent erroneous insertion.

Furthermore, in the secondary battery 1, since the external label 15 is not stuck to the second battery lid 8 which configures the bottom face part of the secondary battery 1, by making it as an engagement part with which the engagement member 19 as provided in the side of an electronic appliance is engaged, even when rubbed repeatedly by the engagement member 19, a situation such as breakage or separation of the external label 15 can be prevented from occurring.

Furthermore, even in the case where the secondary battery 1 is installed in an electronic appliance such as the digital still camera 10 or a battery charger from the bottom face part in the erroneous insertion direction, since the electrodes in the side of the digital still camera 10 or the battery charger as provided corresponding to the positions of the positive electrode terminal part 37 and the negative electrode terminal part 38 come into contact with the synthetic resin-made second battery lid 8 which configures the bottom face part of the secondary battery 1, it is possible to prevent a short circuit as caused due to the direct contact with the metallic battery can from occurring different from a secondary battery in which the bottom face part is formed integrally with the metallic battery can.

In addition, as illustrated in FIG. 28, in the secondary battery 1, by sticking the external label 15 so as to cover the top cover 36 of the first battery lid 4 and the respective upper faces 36*a*, 8*a* and lower faces 36*b*, 8*b* of the second battery lid 8, it is possible to improve the assembling strength of the battery can 2 with the first battery lid 4 and the second battery lid 8. Accordingly, since it is not required to protrude the engagement convexes 47, 50 as formed on the first battery lid 4 and the second battery lid 8 which are engaged with the battery can 2 in the upper face side of the battery can 2 from the engagement holes 6, 9, the assembling strength can be ensured without hindering the flatness or appearance of the second battery 1.

In addition, in the secondary battery 1, by making the position of each of the positive electrode terminal part 37 and the negative electrode terminal part 38 which are formed on the first battery lid 4 different depending upon a difference in the function such as battery capacity while making the battery can 2 and the first battery lid 4 and the second battery lid 8 have the same shape, even in the case where the secondary battery 1 of an incompatible type is installed in the incompatible digital still camera 10, conductance does not occur between the electrode terminals so that a trouble can be prevented from occurring.

In addition, in the secondary battery 1, when the battery can 2 and the battery cell 3 are formed in a substantial trapezoidal shape with respect to the cross section thereof in which the edge line of each side of the short sides is formed in a circular arc shape, it is possible to prevent erroneous insertion of the battery cell 3 into the battery can 2 and to effectively utilize a space within the battery can 2. In this way, it is possible to provide a clearance which when the battery cell 3 is heat expanded, becomes a margin between the battery cell 3 and an inner wall of the battery can 2. Accordingly, even in the case where the battery cell 3 is heat expanded, the battery can 2 does not cause distortion, or an excessive load is not applied to the joining part 45 among the positive electrode terminal 21 and the negative electrode terminal 22 and the positive electrode tab 31 and the negative electrode tab 32.

In addition, in the secondary battery 1, the first battery lid 4 is configured to have the holder 30 for devising to position and fix the positive electrode tab 31 and the negative electrode tab 32, the substrate 35 provided with the positive electrode terminal part 37 and the negative electrode terminal part 38, and the top cover 36 for sandwiching the substrate 35 together with the holder 30. In this way, in the holder 30, by devising to position the positive electrode tab 31 and the negative electrode tab 32 and holding them, it is positive to easily achieve welding with the positive electrode terminal 21 and the negative electrode terminal 22 or with the positive electrode terminal board 33 and the negative electrode germinal board 34. Also, even in the case where an impact is applied by falling or vibration of the secondary battery 1, or the like, it is possible to prevent a situation that the welded portion between the positive electrode tab 31 and the negative electrode tab 32 comes out.

In addition, in the secondary battery 1, since the battery can 2 is installed on the insertion end face 3b of the battery cell 3 via the elastic member 60, not only unsteadiness of the battery cell 3 within the battery can 2 can be prevented, but also an impact due to falling or vibration of the battery can 2, or the like can be absorbed, thereby preventing the impact to apply to the joining part 45. Furthermore, by folding the overlap width 28 along the side face and then inserting the battery cell 3 into the battery can 2, it is possible to make the folded overlap width function as a buffer member between the battery cell 3 and the battery can 2.

In addition, in the secondary battery 1, by sticking the insulating film 61 on the elastic member 60, when the battery cell 3 is inserted into the battery can 2, the insulating film 61 is arranged along the side face of the battery cell 3 while being guided on the side face of the first opening 5 of the battery can 2 to cover the aluminum layer 53 of the pack 23 which is exposed on the cut face of the overlap width 28, thereby enabling it to devise to insulate 23. from the inner wall of the battery can 2. Accordingly, even in the case where the metallic battery can 2 is charged, it is possible to prevent the generation of electrolytic corrosion as caused by current carrying between the battery can 2 and the aluminum 53 of the pack In addition, in the secondary battery 1, since the insulating paper 59 is stuck to the joining part 45 among the positive electrode terminal 21 and the negative electrode terminal 22 and the positive electrode tab 31 and the negative electrode tab 32, not only it is possible to reinforce the joining part 45, but also it is possible to prevent the generation of a short circuit as caused due to the contact with the metallic battery can 2. Furthermore, by accommodating this joining part 45 into the battery can 2 while being curved in a substantially S-shaped form, even in the case where an impact is applied between the battery cell 3 and the first battery lid 4 due to falling or vibration of the secondary battery 1 or the like, the joining part 45 which has been folded in a substantially S-shaped form and accommodated is warped so that a load of the impact is absorbed, thereby preventing the separation of the positive electrode terminal 21 and the negative electrode terminal 22 and the positive electrode tab 31 and the negative electrode tab 32 from occurring.

Figure 29:
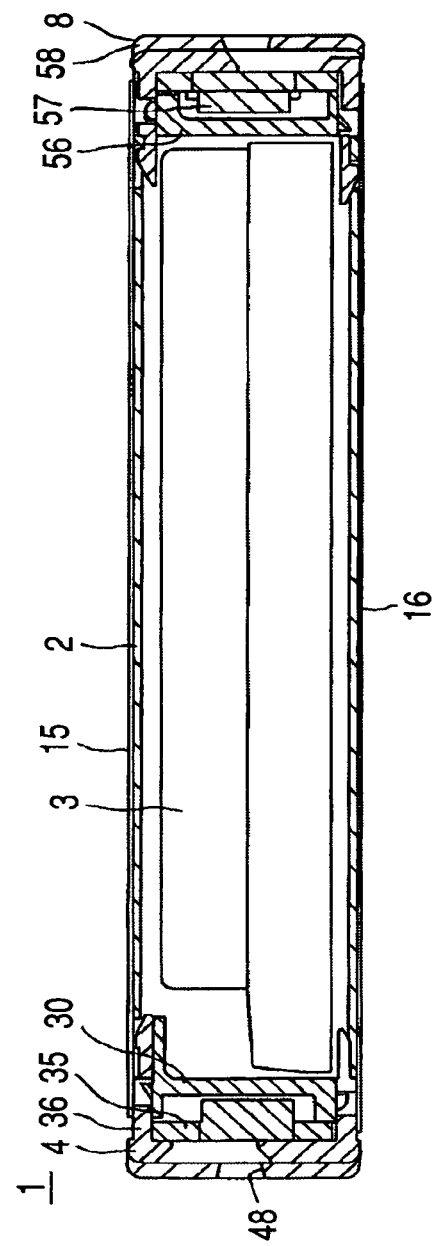
FIG. 29 is a cross-sectional view to show a secondary battery in which a second battery lid is provided with a substrate and an electrode terminal.

Incidentally, as illustrated in FIG. 29, in the secondary battery 1 to which the invention is applied, by forming the second battery lid 8 by a holder 56, a substrate 57 and a bottom cover 58 likewise the first battery lid 4, it is possible to add a drive circuit and a terminal. The configurations of the holder 56, the substrate 57 and the bottom cover 58 are the same as those of the foregoing holder 30, substrate 35 and top cover 36, and therefore, the details thereof are omitted. In the substrate 57, various circuit patterns, semiconductor devices, and so on are formed and connected by the substrate 35 which configures the first battery lid 4, a flexible substrate the details of which are omitted, and so on.

Incidentally, since it is not always required that the substrate 57 is provided with a positive electrode terminal part and a negative electrode terminal part as formed in the substrate 35, a terminal hole such as the terminal hole 48 as provided on the top cover 36 is not always formed on the bottom cover 58. In the case where a can bottom electrode 62 which is made of a positive electrode terminal part and/or a negative electrode terminal part or an earth electrode is provided in the substrate 57, a terminal hole from which the can bottom electrode 62 is faced outwardly is also formed in the bottom cover 58.

Figure 30A:
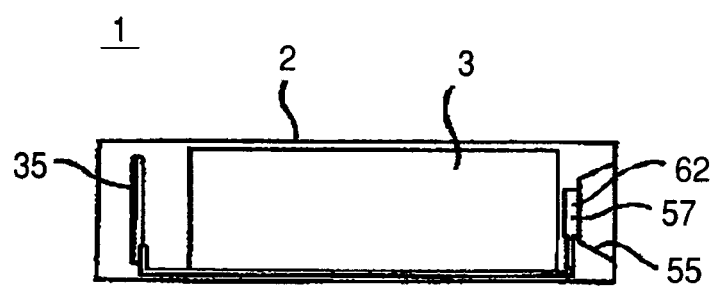
Figure 30B:
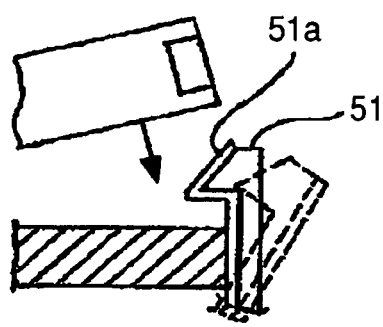

Furthermore, at this time, in the case where the concave engagement part 55 is formed in the bottom cover 58 of the second battery lid 8 over the longitudinal direction, as illustrated in FIG. 30A, a terminal hole is formed in the engagement part 55 of the second battery lid 8, and the can bottom electrode 62 as formed in the substrate 57 is faced outwardly via the engagement part 55. On the other hand, as illustrated in FIG. 30B, an electrode part 51 *a* as connected to an electrode or an earth part in the side of the electronic appliance is formed in the engagement member 51 as provided in the side of the electronic appliance and connected to the can bottom electrode 62 at the same time of engagement with the engagement part 55 of the second battery lid 8.

Incidentally, as described previously, in the secondary battery 1 to which the invention is applied, the battery cell 3 is adhered to the inside of the battery can 2 via the elastic member 60. However, as illustrated in FIGS. 31 A to 31 C, there may be employed a configuration in which prior to the insertion of the battery cell 3, an adhesive 65 is coated on one principal face within the battery can 2, and the adhesive 65 is spread on the one principal face within the battery can 2 by the battery cell 3 to be inserted into the battery can 2, thereby adhering the battery cell 3 to the battery can 2. By employing such a configuration, the battery cell 3 can be fixed in the battery can 2, thereby preventing unsteadiness of the battery cell 3 within the battery can 2 as caused by falling or vibration of the secondary battery 1 or the like. Accordingly, an excessive load is not applied to the joining part 45 among the positive electrode terminal 21 and the negative electrode terminal 22 and the positive electrode tab 31 and the negative electrode tab 32 so that it is possible to prevent the separation of the positive electrode terminal 21 and the negative electrode terminal 22 and the positive electrode tab 31 and the negative electrode tab 32.

Figure 32:
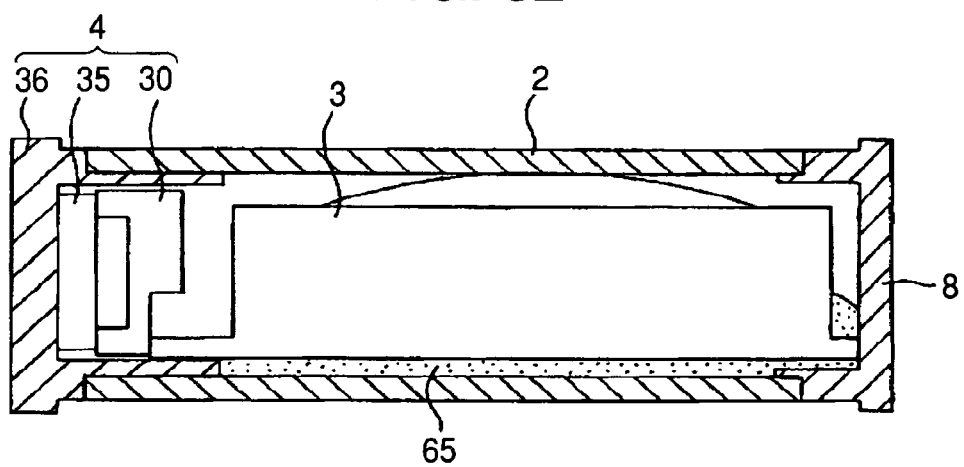
FIG. 32 is a cross-sectional view to show a state of a battery cell which is adhered within a battery can as adhered by an adhesive.

Furthermore, by fixing the battery cell 3 inside the battery can 2 by using the adhesive 65, it is possible to effectively utilize a space within the battery can 2, and it is possible to form a prescribed clearance between the principal face of the battery cell 3 in the opposite side to the adhesive face and an inner wall of the battery can 2 opposing to the foregoing principal face. Accordingly, as illustrated in FIG. 32, even in the case where the battery cell 3 is heat expanded, since a margin against the volume exposition of the battery cell 3 is ensured by the clearance, it is possible to prevent a situation that distortion is generated in the battery can 2 or that an excessive load is applied to the joining part 45.

Figure 33A:
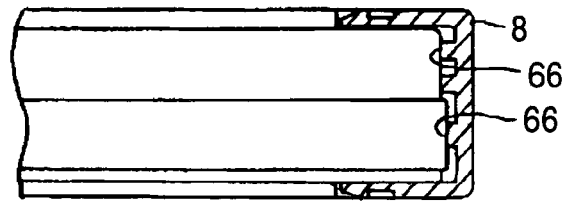
FIG. 33A-33B are cross-sectional views to show a secondary battery in which a projection part for supporting an insertion end face of a battery cell is formed in a second battery lid.
Figure 33B:
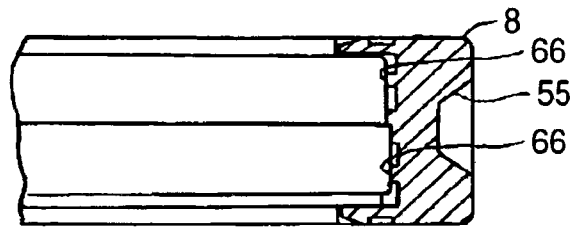

Furthermore, in the secondary battery 1 to which the invention is applied, as illustrated in FIGS. 33A and 33B, projections 66 for supporting the insertion end face 3b of the battery cell 3 may be formed in the second battery lid 8. When the projections 66 support the insertion end face 3b of the battery cell 3 into the battery can 2, even in the case where the battery cell 3 which is shorter than the full length of the battery can 2, the battery cell 3 is accommodated without causing unsteadiness within the battery can 2. A plural number of the projections 66 are intermittently provided in an inner face 8c of the second battery lid 8 in a position opposing to the insertion end face 3b of the battery cell 3. Furthermore, the projections 66 are formed integrally with the second battery id 8 by mold forming a synthetic resin.

Incidentally, the FIG. 33A shows the case where the second battery lid 8 is not provided with the engagement part 55; and FIG. 33B shows the case where the second battery lid 8 is provided with the engagement part 55 in a concave shape. In all of these cases, the elastic member 60 is not stuck onto the insertion end face 3b of the battery cell 3 as supported by the projections 66, and the battery cell 3 is fixed by the adhesive 65 which is fed into the battery can 2. As a matter of course, the second battery lid 8 may be provided with the engagement part 55 in a convex shape.

Figure 34:
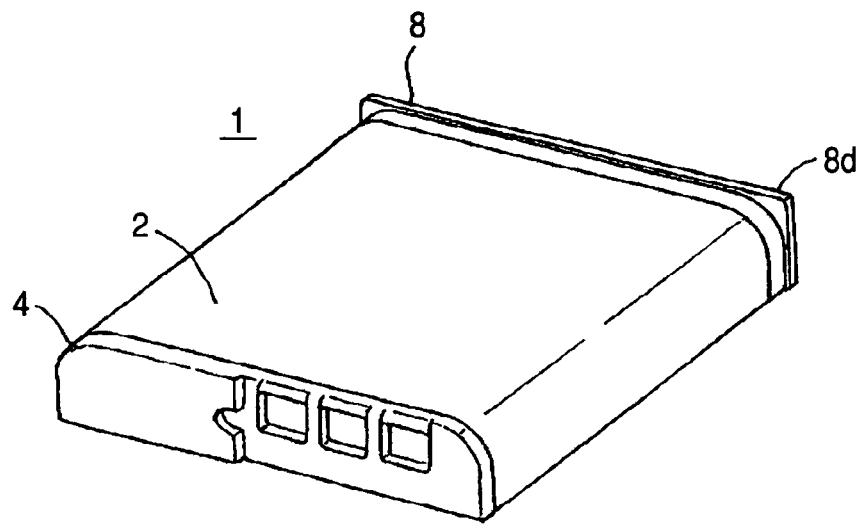
FIG. 34 is an oblique view to show a secondary battery in which a front face of a second battery lid is formed larger than a battery accommodating part.

Furthermore, the secondary battery 1 to which the invention is applied may be formed such that the front face 8d of the second battery lid 8 is projected from the cross-sectional shape of the battery can 2. Concretely, as illustrated in FIG. 34, by forming the front face 8d of the second battery lid 8 in a rectangular shape, a corner of the front face 8d of the second battery lid 8 is projected from the edges of the sides of the short sides of the battery can 2 which is formed in a substantially trapezoidal shape with respect to the cross section thereof such that the edge of each side of the short sides is formed in a circular arc shape.

In this way, by forming the front face of the second battery lid 8 such that it is projected from the outer periphery of the battery can 2, even when it is intended to reversely insert the secondary battery 1 into the battery accommodating part as formed in the electronic appliance such as the digital still camera 10, the front face 8d of the second battery id 8 is formed larger than an insertion opening of the battery accommodating part 12 so that the insertion of the secondary battery 1 into the inside is inhibited by the peripheral wall of the battery accommodating part 12. Thus, it is possible to prevent the reverse insertion in front and in the rear of the secondary battery 1.

Incidentally, with respect to the reverse insertion in back and front of the secondary battery 1, by forming the edge of each side of the short sides of the battery accommodating part 12 in a substantially trapezoidal shape with respect to the cross section thereof such that the edge of each side of the short sides is formed in a circular arc shape, the square-shaped edges of the sides of the long sides of the secondary battery 1 are interfered with the edges in a circular arc shape as formed in the sides of the short sides of the battery accommodating part, thereby inhibiting the insertion (see FIGS. 5A and 5B).

Figure 35:
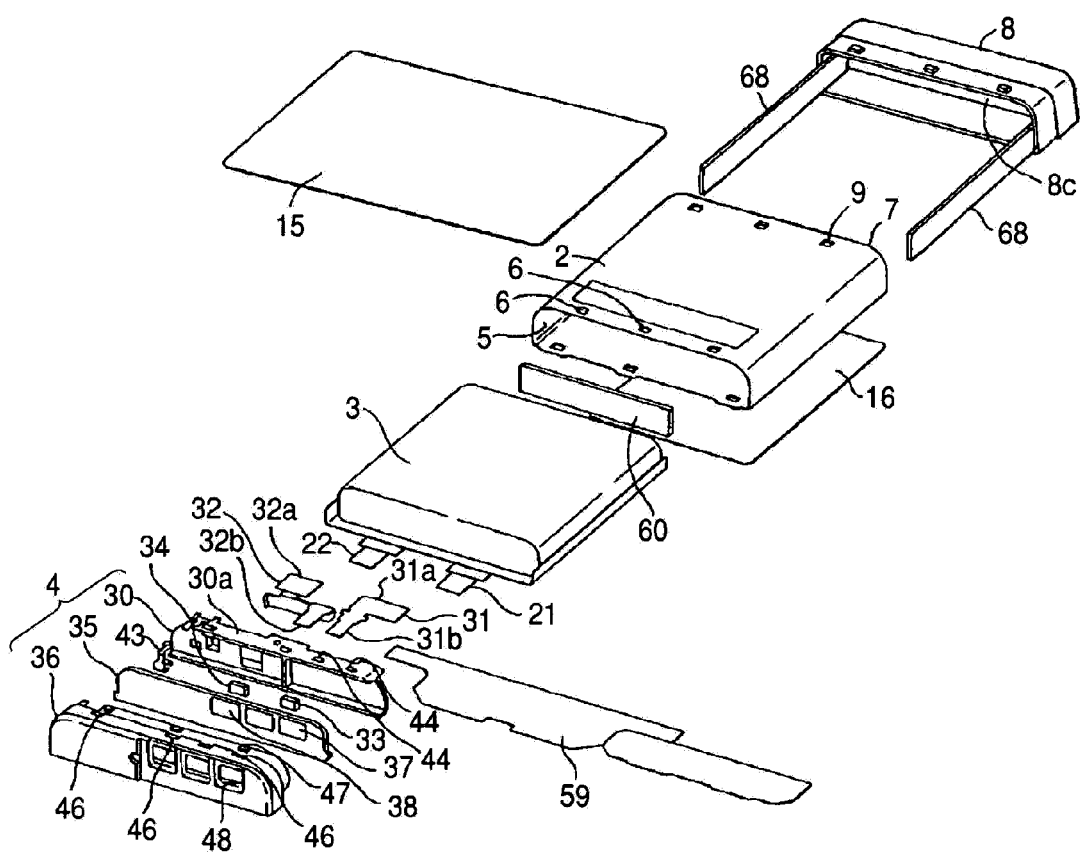
FIG. 35 is an oblique view to show a secondary battery in which fins for preventing the contact between a battery cell and a battery can are formed in a second battery lid.

Furthermore, in the secondary battery 1 to which the invention is applied, as illustrated in FIG. 35, a pair of fins 68, 68 which are formed longitudinally from the inner face 8c of the second battery lid 8 may be provided. The pair of fins 68, 68 are provided for the purpose of insulating the cut face of the overlap width 28 as folded on the side face of the battery cell 3 which is inserted into the battery can 2 from the inner wall of the battery can 2 and vertically provided on the inner face 8c of the second battery lid 8 along the side face of the battery can 2 from the both end parts in the longitudinal direction.

The fins 68, 68 are inserted along the side face of the battery can 2 in assembling the second battery lid 8 in the second opening 7 of the battery can 2 and have rigidity such that they are arranged straight along the side face of the battery can 2 without being folded or curved at the time of insertion. Furthermore, though the fins 68, 68 are formed integrally in mold forming the second battery lid 8 by using an insulating synthetic resin, they are separately fitted after the formation of the second battery lid 8.

By assembling the second battery lid 8 in the battery can 2, the insulating fins 68, 68 are arranged along the inner face of the battery can 2; and when the battery cell 3 is subsequently inserted, the fins 68, 68 are mediated between the cut face of the overlap width 28 which is faced at the side face of the battery cell 3 and the battery can 2, thereby insulating the both from each other. In this way, it is possible to prevent the direct contact of the aluminum (Al) layer 53 which is faced at the cut face of the overlap width 28 with the metallic battery can 2. Accordingly, even in the case where the metallic battery can 2 is charged, it is possible to prevent a phenomenon in which the battery can 2 comes into direct contact with the aluminum layer 53 of the pack 23, thereby becoming a negative electrode; the polypropylene layer 52 has a hole due to some cause, thereby causing electrolytic corrosion; the pack 23 has a hole; and moisture invades from this hole, thereby causing expansion of the battery cell 3.

Furthermore, in the case where the insulating film 61 as stuck on the foregoing elastic member 60 is used, for the purpose of preventing a deviation in sticking of the elastic member 60, a warp of the insulating film 61, or the like, the working steps become complicated, and the costs become high. However, the case where the fins 68, 68 are projected is advantageous from the standpoints the complicity in the steps and costs.

Figure 36:
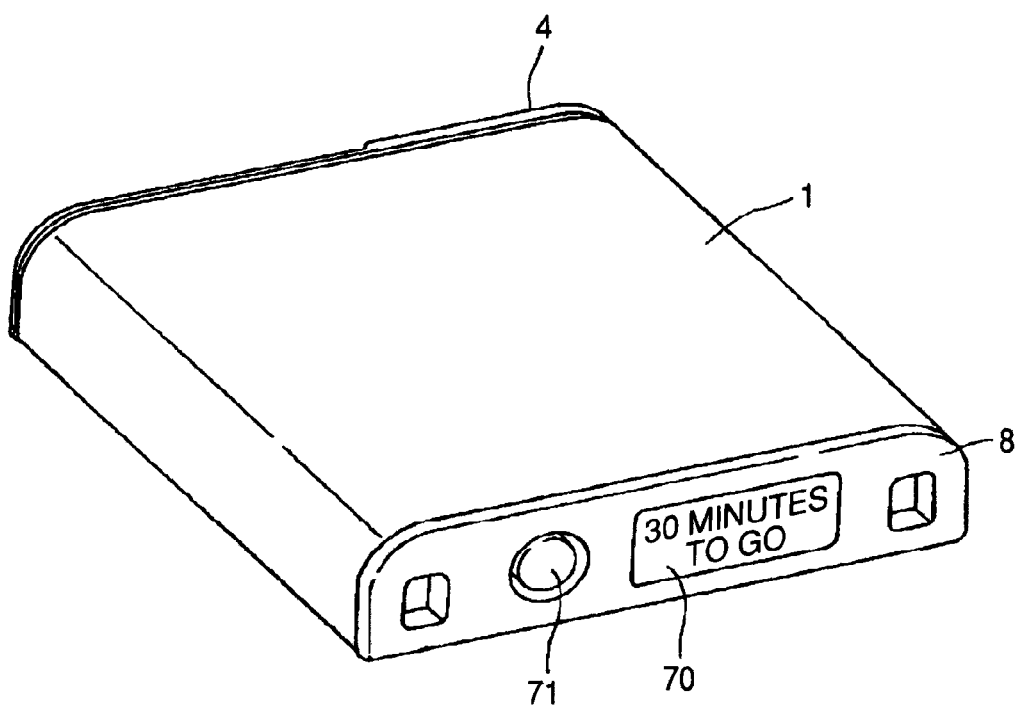
FIG. 36 is an oblique view to show a secondary battery in which a second battery lid is provided with a residual battery life display part.

Furthermore, in the secondary battery 1 o which the invention is applied, as illustrate in FIG. 36, a residual battery life display part 70 may be provided in the second battery lid 8. In the residual battery life display part 70, for example, a liquid crystal display is formed on the front face 8d of the second battery lid 8, thereby displaying the residual battery life of the secondary battery 1. Furthermore, a switch 71 for displaying the residual battery life in the residual battery life display part 70 is formed on the front face 8*d* of the second battery lid 8. On the inner face 8*c* of the second battery lid 8, not only the liquid crystal display constituting the residual battery life display part 70 and the switch 71 are formed, but also a circuit board in which a drive circuit is formed is provided (not illustrated).

Where the switch 71 is press operated, the residual battery life display part 70 displays the residual battery life of the secondary battery 1 by, for example, the available time. Accordingly, since a user is easily aware of the residual battery lifer of the secondary battery before it is installed in an electronic appliance or the like, a fear that the battery causes run-down during the drive of the electronic appliance is reduced.

Incidentally, the residual battery life display part 70 may display the residual battery life by using an organic EL display or an LED device in addition to the foregoing liquid crystal display. Furthermore, the display manner is not limited to a display manner by letters, but the residual battery life may be displayed by lighting of LED.

Figure 37:
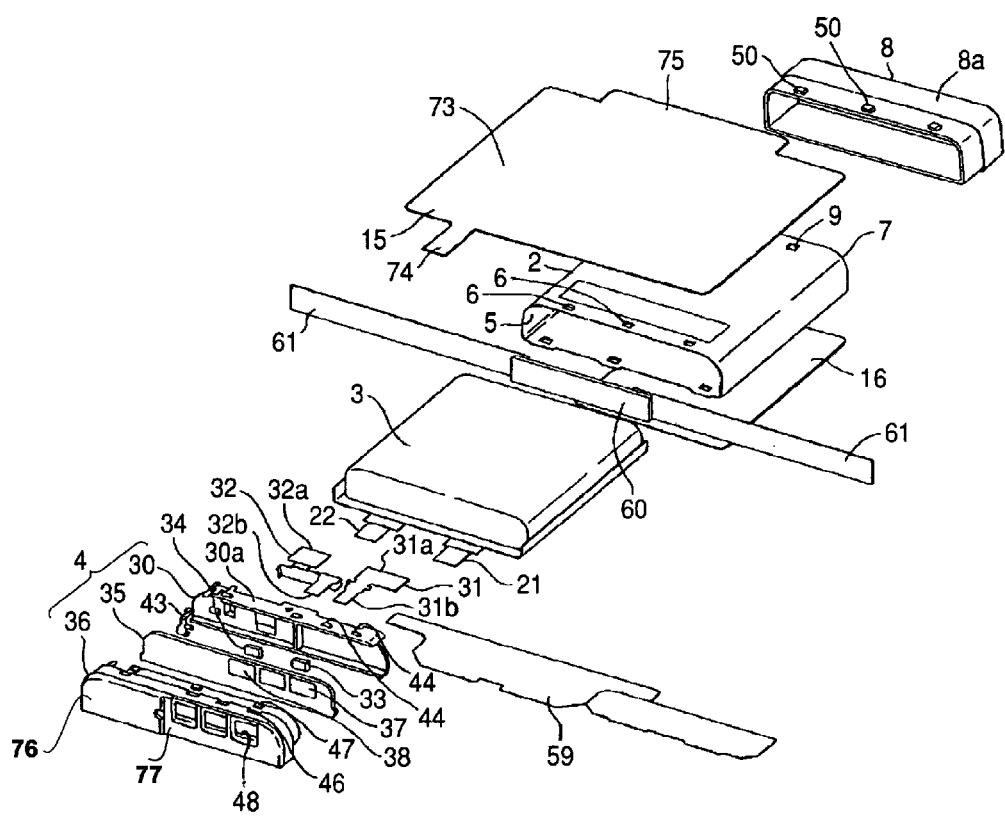
FIG. 37 is a detailed oblique view to show a secondary battery in which an external label is provided with winding parts for winding first and second battery lids.

Furthermore, in the secondary battery 1 to which the invention is applied, as illustrated in FIG. 37, the external label 15 may be configured to have a principal face part 73 for winding the outer periphery of the battery can 2 over the first opening 5 and the second opening 7, a first winding part 74 which is wound over the top cover 36 of the first battery id 4, and a second winding part 75 which is wound over the second battery lid 8. The first winding part may 74 of external label 15 may cover a first area 76 of top cover 36. A second area 77 of top cover 36, smaller in shape with respect to cross-section than first area 76, may be disposed outside of external label 15.

All of the first winding part 74 and the second winding part 75 are used for improving the assembling strength of the battery can 2 with the first battery lid 4 and the second battery lid 8. When the assembling strength of the battery can 2 with the first battery lid 4 and the second battery lid 8 is improved by the first winding part 74 and the second winding part 75, it is not necessary to ensure the assembling strength of the battery can 2 with the first battery lid 4 and the second battery lid 8 by increasing the engagement depth with the engagement holes 6 and the engagement holes 9 which are engaged with the engagement convex 47 and the engagement convex 50 as provided in the top cover 36 of the first battery lid 4 and the second battery lid 8 and the engagement convex 47 and the engagement convex 50 as provided in the surrounding of the first opening 5 and the second opening 7 of the battery can 2 and projecting the engagement convex 47 and the engagement convex 50 on the upper face of the battery can 2 from the engagement holes 6 and the engagement holes 9. Accordingly, a desired assembling strength can be obtained without hindering the flatness or appearance of the second battery 1.

Concretely, the first winding part 74 to be wound on the front face the top cover 36 is wound in a region exclusive of the terminal hole 48 as formed on the front face 36*c* of the top cover 36. Furthermore, in the case where the foregoing engagement part 49 is formed on the front face 36*c* of the top cover 36, the first winding part 74 is wound in a region exclusive of the terminal hole 48 and the engagement part 49.

Furthermore, the second winding part 75 to be wound on the second battery lid 8 is wound in a region exclusive of one end part in the longitudinal direction to be engaged with the engagement member 19 as formed in the battery accommodating part 12 of the foregoing electronic appliance. In this way, it is possible to prevent the separation as caused due to rubbing of the second winding part 75 and the engagement member 19. That is, when the second winding part 75 is stuck so as to cover entirely the front face 8*d* of the second battery id 8, the engagement member 19 rubs the second winding part 75 every time when the secondary battery 1 is inserted into and detached from the battery accommodating part 12, whereby the external label 15 is rubbed and separated step by step. At this issue, in the secondary battery 1, since the external label 15 is not stuck in a region exclusive of one end part in the longitudinal direction to be engaged with the engagement member 19, even in the case where the secondary battery 1 is repeatedly inserted into and detached from the battery accommodating part 12, there is no fear of the occurrence of rubbing by the engagement member 19.

Furthermore, in the case where the engagement part 55 is formed on the front face 8*d* of the second battery lid 8, the second winding part 75 is wound in a region exclusive of the engagement part 55. In the case where the engagement part 55 is formed over the longitudinal direction of the front face 8*d*, the second winding part 75 is wound so as to cover an upper side than the engagement part 55. Furthermore, in the case where the engagement part 55 is formed in the both end parts in the longitudinal direction of the front face 8*d*, the second winding part 75 is wound so as to cover a region exclusive of the both end parts of the front face 8*d*. In this way, the engagement part 55 can be always exposed to the outside.

Figure 38:
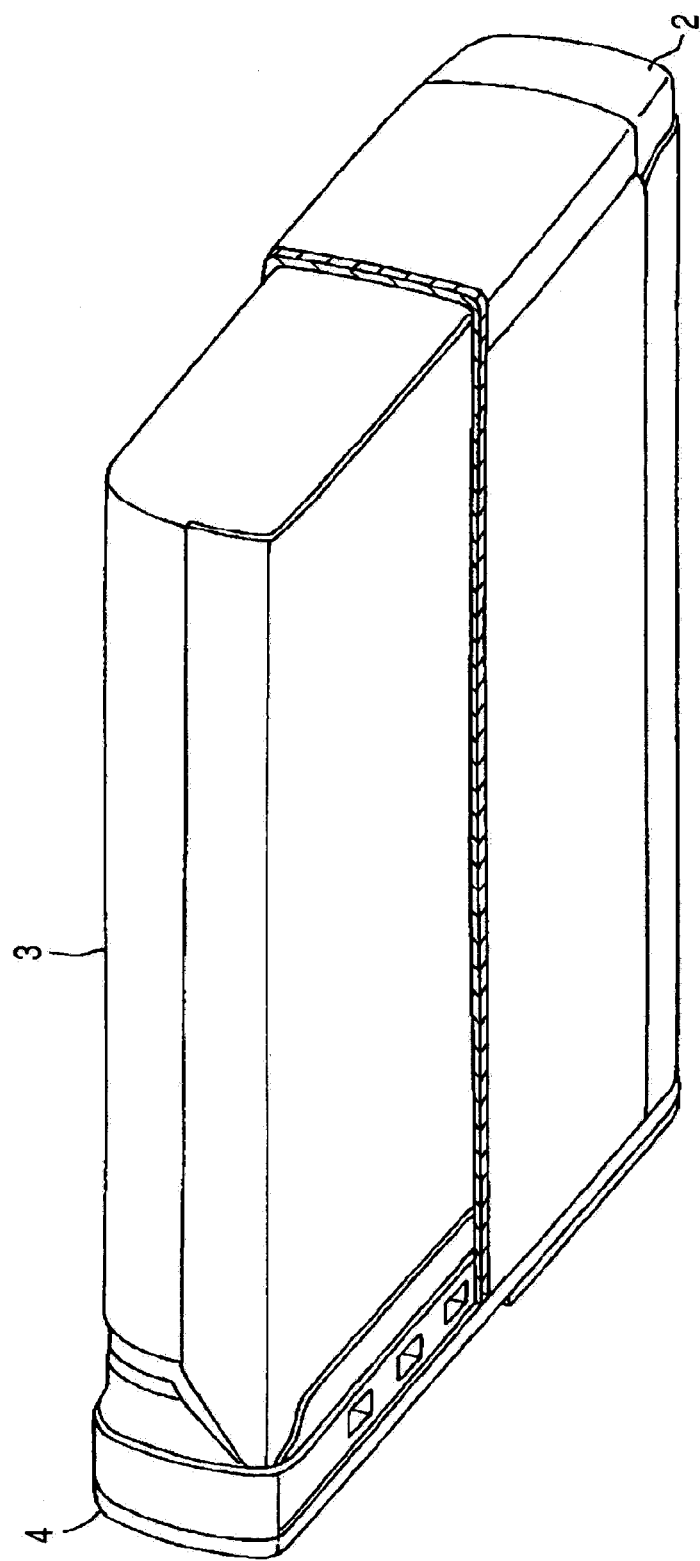
FIG. 38 is an oblique view to show a secondary battery provided with only one opening of a battery can.
Figure 39:
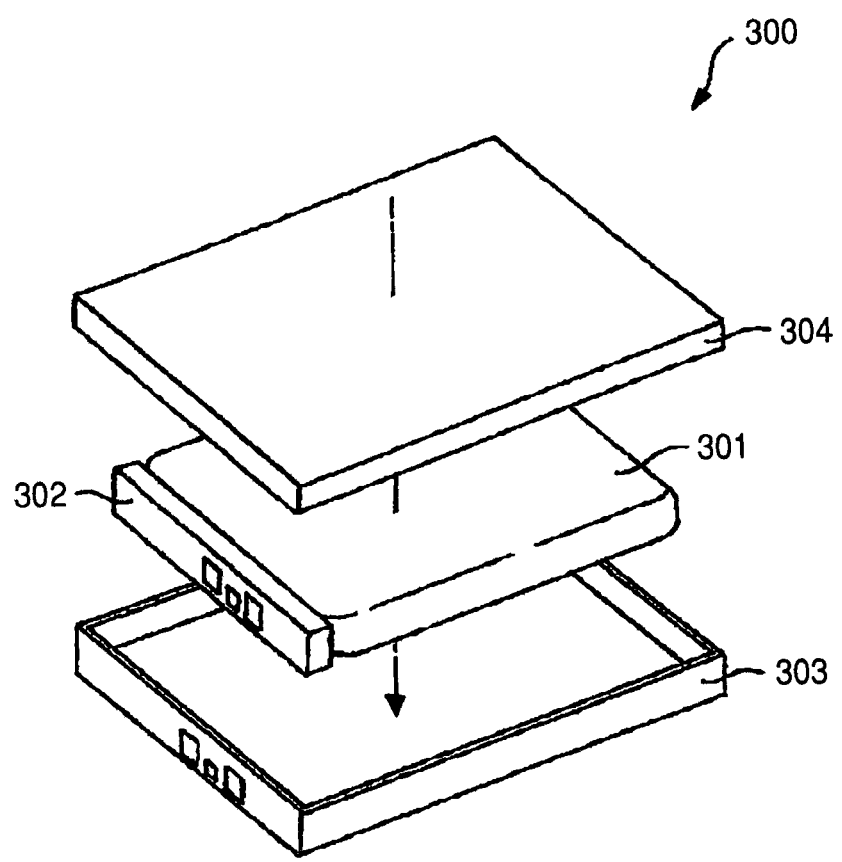
FIG. 39 is an oblique view to show a related-art polymer lithium ion secondary battery.

In the light of the above, the secondary battery 1 in which the first opening 5 and the second opening 7 are provided in front and in the rear of the battery can 2 and plugged by the first battery lid 4 and the second battery lid 8, respectively has been described. However, in the invention, as illustrated in FIG. 38, there may be employed a configuration in which a metallic battery can is formed such that an opening is provided in only one end in the insertion direction of the battery cell 3 and plugged by the synthetic resin-made first battery lid 4 as connected to the battery cell 3. In this case, the battery can 2 is formed by deep drawing processing. Even in a secondary battery in which five faces are provided in such a battery can and a battery cell is inserted from one opening, followed by plugging by a battery lid, by using a metallic battery can, slimming and insurance of strength can be realized at the same time so that the requirements of downsizing, slimming and lightweight of an electronic appliance can be met, Furthermore, since the plastic resin-made lid is used, it is possible to easily form the external shape which becomes an installing end in installing the secondary battery in a battery installing part of the electronic appliance. By this external shape, it can be used as a discrimination part for discriminating a function or attribute such as a battery capacity, the necessity of quick recharge, the presence or absence of a residual battery life display function or a control part for controlling the installation against an incompatible electronic appliance.

It should be understood by those skilled in the art that various modifications, combinations, sub-combinations and alternations may occur depending on design requirements and other factors insofar as they are within the scope of the appended claims or the equivalents thereof.

What is claimed is:
1. A battery for an electronic appliance comprising:
   a battery cell;
   a battery body having a first open end and a second end disposed at opposite ends of the battery body;

an electrode terminal part connected to a positive electrode terminal and a negative electrode terminal of the battery cell, the positive electrode terminal and the negative electrode terminal being faced outwardly;
a first cover disposed on the electrode terminal part at the first open end of the battery body;
a second cover, having a concave engagement part formed along a longitudinal direction of the second cover, disposed at the second end of the battery body; and
an external label stuck to the periphery of the battery, covering the battery body, the first cover, and the second cover,
wherein the first cover includes a first area and a second area, the first area being covered by the external label, the second area is faced outwardly, and
wherein the second area has a smaller shape than the first area with respect to a cross section.

2. The battery according to claim 1, wherein:
an electrode terminal is formed in an engagement part, the engagement part being configured to engage an engagement member formed in a battery accommodation part provided in the electronic appliance; and
an electrode part, to be connected to the electrode terminal upon being engaged with the engagement part, is formed in the engagement member.

3. The battery according to claim 1,
wherein a discrimination part is formed in at least one of a first lid and a second lid, the first lid plugging the first open end of the battery body and the second lid plugging the second end of the battery body,
wherein the first lid includes the first cover and the second lid includes the second cover, and
wherein the discrimination part comprises a shape different from a shape of a discrimination part of a second battery having a different function.

4. The battery according to claim 1,
wherein a projection, which comes into contact with an end face of the battery cell and which supports the battery cell as accommodated in the battery body, is formed in at least one of a first lid and a second lid, the first lid plugging the first open end of the battery body and the second lid plugging the second end of the battery body, wherein the first lid includes the first cover and the second lid includes the second cover.

5. The battery according to claim 1, wherein the battery body is formed by cutting a metallic cylinder depending upon a length of the battery cell.

6. The battery according to claim 1, wherein a lid in a side opposite to an insertion end configured for insertion into a battery accommodating part in the electronic appliance is formed larger than an insertion opening of the battery accommodating part.

7. The battery according to claim 1, wherein the external label, which is made of an insulating material, is wound over the periphery of the battery body.

8. The battery according to claim 1,
wherein the external label includes a principal face part to be wound on the outer periphery of the battery body and a winding part to be wound in at least one of a first lid and a second lid, the first lid plugging the first open end of the battery body and the second lid plugging the second end of the battery body,
wherein the first lid includes the first cover and the second lid includes the second cover.

9. The battery according to claim 1,
wherein a residual battery life display part for displaying the residual battery life is formed in at least one of a first lid and a second lid, the first lid plugging the first open end of the battery body and the second lid plugging the second end of the battery body,
wherein the first lid includes the first cover and the second lid includes the second cover.

10. The battery according to claim 1, wherein in the battery cell, a pressure sensitive adhesive double coated seal made of an elastic material is adhered to a second side face, which is opposite a first side face, and a lid opposing the second side face.

11. The battery according to claim 10, wherein:
a longitudinal insulating film is fixed to two end parts of the pressure sensitive adhesive double coated seal; and
the longitudinal insulating film is configured to be folded upon insertion of the battery cell into the battery body such that a cut face of a pack accommodating the battery cell is insulated from an inner peripheral wall of the battery body.

12. The battery according to claim 1, wherein a projected piece which is made of an insulating material capable of insulating a cut face of a pack accommodating the battery cell from an inner peripheral wall of the battery body is vertically provided in two end parts of a lid opposing a side face of the battery cell that is configured to be inserted into the battery body.

13. The battery according to claim 1, wherein in the battery cell, one planar face is adhered onto a principal face of the battery body by an adhesive to be fed into the principal face of the battery body.

14. The battery according to claim 1, wherein:
a substrate is provided with a positive electrode terminal board and a negative electrode terminal board connected to a positive electrode terminal part and a negative electrode terminal part, respectively,
the positive electrode terminal part is connected to the positive electrode terminal and the negative electrode terminal part is connected to the negative electrode terminal,
a holder is configured to hold a positive electrode tab and a negative electrode tab, the positive electrode tab and the negative electrode tab configured to connect the positive electrode terminal and the negative electrode terminal to the positive electrode terminal board and the negative electrode terminal board, respectively, and
the first cover of a lid of the battery is provided with a plurality of terminal holes from which a positive electrode terminal part and a negative electrode terminal part are faced outwardly and an engagement part configured to engage a part in an opening of the battery body.

15. The battery according to claim 14, wherein an insulating paper is fixed in a connecting part adjacent the positive electrode terminal and the negative electrode terminal and the positive electrode tab and the negative electrode tab.

16. The battery according to claim 14, wherein the positive electrode terminal comprises aluminum, the positive electrode tab comprises nickel, and a portion of the positive electrode terminal is welded to an upper portion of the positive electrode tab.

17. The battery according to claim 14, wherein a connecting part, adjacent to the positive electrode terminal and the negative electrode terminal and the positive electrode tab and the negative electrode tab, is accommodated in the battery body and the battery body includes a curved portion.

18. The battery according to claim 1, wherein a positive electrode terminal part connected to the positive electrode terminal and a negative electrode terminal part connected to the negative electrode terminal are positioned with regard to the at least one of a first lid and a second lid so as to be a mirror image of another positive electrode terminal part and another negative electrode terminal part provided in a lid of a second battery.

19. The battery according to claim 1, wherein an engagement part, which is configured to engage an engagement member formed in a battery accommodation part provided in the electronic appliance, includes at least one engagement convex disposed along a long edge of the first cover of a lid of the battery.

20. The battery according to claim 19, wherein the at least one engagement convex includes two engagement convexes disposed proximate a first end and a second end of the long edge of the first cover, respectively, and wherein the at least one engagement convex includes a third engagement convex disposed proximate to the middle of the long edge of the first cover.

21. The battery according to claim 1, further comprising a first lid and a second lid, the first lid plugging the first open end of the battery and the second lid plugging the second end of the battery are made of synthetic resin.

22. The battery according to claim 1, wherein a plurality of coupling holes are provided on a second area of the first cover of a lid of the battery and engaging with a plurality of coupling projections provided on a holder of the lid.

\* \* \* \* \*